US011875680B2

(12) United States Patent
Jain et al.

(10) Patent No.: US 11,875,680 B2
(45) Date of Patent: *Jan. 16, 2024

(54) SYSTEMS AND METHODS FOR AUGMENTING PERCEPTION DATA WITH SUPPLEMENTAL INFORMATION

(71) Applicant: Lyft, Inc., San Francisco, CA (US)

(72) Inventors: Ashesh Jain, Sunnyvale, CA (US); Yunjian Jiang, San Jose, CA (US); Mushfiqur Rouf, San Francisco, CA (US); Henru Wang, Palo Alto, CA (US); Lei Zhang, Sunnyvale, CA (US)

(73) Assignee: Lyft, Inc., San Francisco, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 16/983,414

(22) Filed: Aug. 3, 2020

(65) Prior Publication Data

US 2021/0303877 A1  Sep. 30, 2021

Related U.S. Application Data

(63) Continuation of application No. 16/836,736, filed on Mar. 31, 2020, now Pat. No. 10,733,463.

(51) Int. Cl.
*G06V 20/58* (2022.01)
*G08G 1/16* (2006.01)
(Continued)

(52) U.S. Cl.
CPC ........... *G08G 1/165* (2013.01); *G05D 1/0219* (2013.01); *G06V 10/764* (2022.01); *G06V 10/95* (2022.01);
(Continued)

(58) Field of Classification Search
CPC ...... G08G 1/165; G08G 1/166; G05D 1/0219; G06V 10/764; G06V 10/95; G06V 20/20;
(Continued)

(56) References Cited

U.S. PATENT DOCUMENTS 10,733,463 B1   8/2020  Jain et al.
2018/0288182 A1*  10/2018  Tong ................... G06V 20/597
(Continued)

FOREIGN PATENT DOCUMENTS

KR   1020190002950 A   1/2019

OTHER PUBLICATIONS

International Searching Authority, International Search Report and Written Opinion, PCT/US2021/025236, dated Mar. 31, 2021, 9 pages.

*Primary Examiner* — Charlotte M Baker
(74) *Attorney, Agent, or Firm* — Lee Sullivan Shea & Smith LLP

(57) ABSTRACT

Examples disclosed herein may involve a computing system that is configured to (i) obtain previously-derived perception data for a collection of sensor data including a sequence of frames observed by a vehicle within one or more scenes, where the previously-derived perception data includes a respective set of object-level information for each of a plurality of objects detected within the sequence of frames, (ii) derive supplemental object-level information for at least one object detected within the sequence of frames that adds to the previously-derived object-level information for the at least one object, (iii) augment the previously-derived perception data to include the supplemental object-level information for the at least one object, and (iv) store the augmented perception data in an arrangement that encodes a hierarchical relationship between the plurality of objects, the sequence of frames, and the one or more scenes.

20 Claims, 11 Drawing Sheets

(51) Int. Cl.
    *G05D 1/02*           (2020.01)
    *G06V 20/40*         (2022.01)
    *G06V 10/764*      (2022.01)
    *G06V 10/94*         (2022.01)
    *G06V 20/20*         (2022.01)
    *G06V 20/56*         (2022.01)

(52) U.S. Cl.
    CPC .............. *G06V 20/20* (2022.01); *G06V 20/41* (2022.01); *G06V 20/56* (2022.01); *G06V 20/58* (2022.01)

(58) Field of Classification Search
    CPC ........ G06V 20/41; G06V 20/56; G06V 20/58; G06F 18/24323
    USPC ......................................................... 382/104
    See application file for complete search history.

(56) References Cited

U.S. PATENT DOCUMENTS

| | | |
|---|---|---|
| 2019/0318206 A1 | 10/2019 | Smith et al. |
| 2019/0377965 A1* | 12/2019 | Totolos, Jr. ............ G06N 3/045 |
| 2020/0090366 A1 | 3/2020 | Korjus et al. |
| 2020/0160558 A1* | 5/2020 | Urtasun ............ G06F 18/21355 |

\* cited by examiner

SYSTEMS AND METHODS FOR AUGMENTING PERCEPTION DATA WITH SUPPLEMENTAL INFORMATION

CROSS REFERENCE TO RELATED APPLICATIONS

This application is a continuation of and claims priority to U.S. patent application Ser. No. 16/836,736, filed on Mar. 31, 2020, entitled "SYSTEMS AND METHODS FOR AUGMENTING PERCEPTION DATA WITH SUPPLEMENTAL INFORMATION," which is hereby incorporated by reference in its entirety for all purposes.

BACKGROUND

Vehicles are increasingly being equipped with technology that enables them to monitor their surrounding environment and perform certain tasks with little or no human input, as appropriate. For instance, vehicles may be equipped with (i) sensors that are configured to capture various types of sensor data that is representative of the vehicle's surrounding environment, (ii) an on-board computing system that is configured to perform functions such as perception of the vehicle's surrounding environment (including object detection), prediction of future object behavior, and planning of the vehicle's future behavior, and (iii) actuators that are configured to control the physical behavior of the vehicle, among other possibilities.

SUMMARY

In one aspect, the disclosed technology may take the form of a method that involves (i) obtaining previously-derived perception data for a collection of sensor data comprising a sequence of frames observed by a vehicle within one or more scenes, wherein the previously-derived perception data comprises a respective set of object-level information for each of a plurality of objects detected within the sequence of frames, (ii) deriving supplemental object-level information for at least one object detected within the sequence of frames that adds to the previously-derived object-level information for the at least one object, (iii) augmenting the previously-derived perception data to include the supplemental object-level information for the at least one object, and (iv) storing the augmented perception data in an arrangement that encodes a hierarchical relationship between the plurality of objects, the sequence of frames, and the one or more scenes.

In some example embodiments, the method may also involve determining at least one of supplemental frame-level information or supplemental scene-level information associated with the at least one object based on the encoded hierarchical relationship of the augmented perception data.

Further, in example embodiments, the method may also involve (i) based on the supplemental object-level information for a given frame in the sequence of frames, deriving supplemental frame-level information for the given frame comprising spatial information observed by the vehicle, and (ii) augmenting the perception data to include the supplemental frame-level information.

Further yet, in example embodiments, the method may also involve (i) based on the supplemental object-level information across a given scene, deriving supplemental scene-level information for the given scene comprising one or both of spatial information or temporal information observed by the vehicle within the scene, and (ii) augmenting the perception data to include the supplemental scene-level information.

Still further, in some example embodiments, the method may also involve executing a query that is based at least in part on the supplemental object-level information included in the augmented perception data. The query may comprise (i) a query for identifying one or more frames during which a given type of scenario was being observed or (ii) a query for identifying one or more occurrences of a given type of perception event.

Still further, in some example embodiments, the perception event may comprise one of (i) a detection of phantom objects, (ii) an object class label switch, or (iii) an object tracking discontinuity, and the method may further comprise deriving a perception performance metric that is based on a number of occurrences of the perception event over a given number of frames Still further, in example embodiments, the supplemental object-level information for the at least one object may comprise supplemental geometric information that indicates a spatial relationship between the at least one object and the vehicle.

Still further, in example embodiments, the supplemental object-level information for the at least one object may comprise supplemental semantic information that indicates a behavioral relationship between the at least one object and the vehicle.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1A:
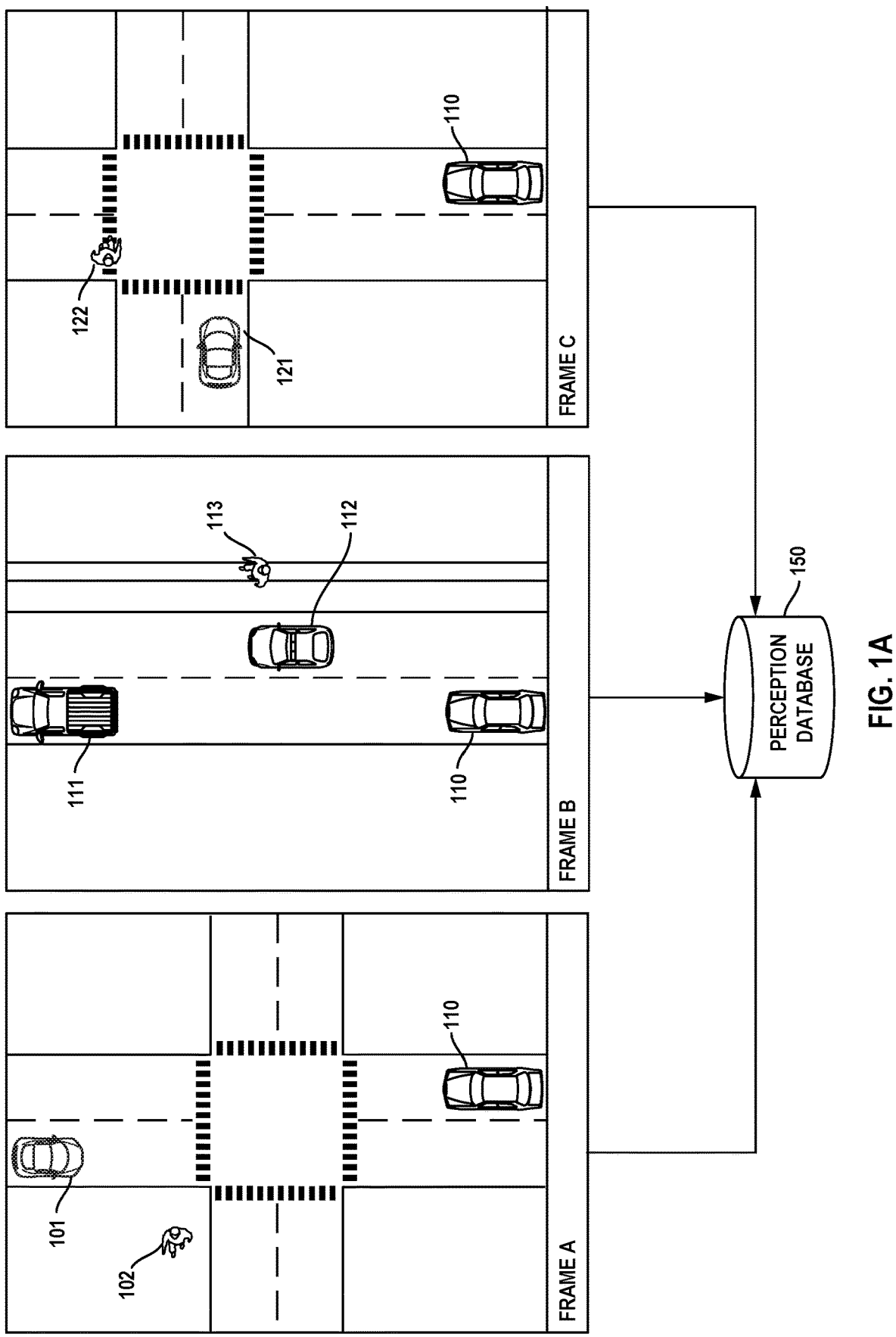
FIG. 1A is a diagram that that illustrates three different points in time at which an ego vehicle captured sensor data in accordance with existing approaches.

Vehicles are increasingly being equipped with technology that enables them to monitor their surrounding environment and perform certain tasks with little or no human input, as appropriate. For instance, such a vehicle may be equipped with (i) sensors that are configured to capture various types of sensor data that is representative of the vehicle's surrounding environment, (ii) an on-board computing system that is configured to perform functions that enable the vehicle to gain an understanding of its surrounding environment and then plan its behavior within that surrounding environment, and (iii) actuators that are configured to control the physical behavior of the vehicle, among other possibilities—all of which may collectively be referred to as the vehicle's "autonomy system." One possible example of a vehicle equipped with such technology may be a vehicle having some level of autonomous driving capability (e.g., a semi- or fully-autonomous vehicle), which may be referred to herein as an "autonomous vehicle" (or "AV" for short), although it should be understood that other types of vehicles equipped with advanced driver assistance systems (ADAS) or the like could be equipped with aspects of this technology as well. For purposes this disclosure, a vehicle that is equipped with such an autonomy system may be referred to as an "ego vehicle."

In practice, when an ego vehicle is operating in a real-world environment, the ego vehicle's autonomy system may be configured to repeatedly iterate through a given sequence of operations that enable the ego vehicle to gain an understanding of its surrounding environment and then behave appropriately within that surrounding environment. For instance, an autonomy system's sequence of operations may begin with the autonomy system capturing various types of sensor data that is representative of the surrounding environment, examples of which may include two-dimensional (2D) sensor data such as image data and three-dimensional (3D) sensor data such as Light Detection and Ranging (LIDAR) data, Radio Detection and Ranging (RADAR) data, and/or Sound Navigation and Ranging (SONAR) data, among other possibilities.

Next, the autonomy system may perform a "perception" operation, which may generally involve (i) analyzing the captured sensor data along other available data about the surrounding environment (e.g., map data) in order to detect objects within the vehicle's surrounding environment and derive certain information about each of the detected objects (e.g., an object's class, position, orientation, speed, and/or acceleration), and then (ii) encoding the derived information about each of the detected objects into a dataset that may be referred to herein as a "perception dataset."

In turn, the autonomy system may perform a "prediction" operation, which may generally involve (i) analyzing the most-recent one or more perception datasets for the surrounding environment along with other available data about the surrounding environment (e.g., map data) in order to predict the future behavior of each of the detected objects (e.g., an object's future trajectory) and then (ii) encoding the predicted future behavior into a dataset that may be referred to herein as a "prediction dataset."

Following the perception and prediction operations, the autonomy system may then perform a "planning" operation, which may generally involve (i) analyzing the most-recent one or more perception and prediction datasets for the surrounding environment along with other available data about the surrounding environment (e.g., map data) in order to derive a behavior plan for the ego vehicle, which defines the desired driving behavior of the ego vehicle for some future period of time (e.g., the next 5 seconds), and then (ii) encoding the derived behavior plan into a dataset that may be referred to herein as a "planning dataset."

Lastly, the autonomy system may perform a "control" operation, which may generally involve transforming the derived behavior plan for the ego vehicle into one or more control signals (e.g., a set of one or more command messages) for causing the ego vehicle to execute the derived behavior plan, such as control signals for causing the ego vehicle to adjust its steering in a specified manner, accelerate in a specified manner, and/or brake in a specified manner, among other possibilities.

As noted above, an ego vehicle's autonomy system may be configured to iterate through this sequence of operations in a repeated manner as the ego vehicle continues to operate in the real-world environment, such as many times per second, which means that the ego vehicle's autonomy system captures multiple different sensor datasets and generates multiple different perception datasets, prediction datasets, and planning datasets during the course of its operation in the real-world environment. In this respect, each snapshot of time for which the ego vehicle's autonomy system captures a sensor dataset and derives corresponding perception, prediction, and planning datasets may be referred to herein as "frame."

It should be understood that the sequence of operations that are iteratively performed by an ego vehicle's autonomy system may include various other operations and/or take various other forms as well.

Based on the foregoing, it will be appreciated that perception is a key aspect of an ego vehicle' autonomy system. Indeed, the perception operation is what allows an ego vehicle to gain an understanding what objects are in the ego vehicle's surrounding environment, where those objects are located relative to the ego vehicle, and how those objects are currently moving—all of which typically needs to be accounted for when deriving a safe, naturalistic behavior plan for the ego vehicle. However, perception is a technically challenging task, and in order to perform it reliably, an ego vehicle's autonomy system needs to be capable of detecting and classifying numerous different types of objects from any of numerous different distances and angles, all while the ego vehicle and/or the objects in the ego vehicle's surrounding environment are in motion.

In view of these technical challenges, there is presently a lot of time and effort going into developing and improving the technology that enables an ego vehicle's autonomy system to reliably perform perception while the ego vehicle is operating in a real-world environment. This development process has typically involved a fair amount of testing and iteration, as it is often difficult to determine how different versions of perception technology will perform relative to one another until that perception technology is deployed and tested in a real-world or simulated environment. For instance, it may be the case that one version of perception technology may be better at reliably detecting and characterizing objects when faced with some circumstances (e.g., objects that are 20 meters or closer to the ego vehicle), while another version of perception technology may be better at reliably detecting and characterizing objects when faced with other circumstances (e.g., objects that are more than 20 meters away from the ego vehicle).

Given the present focus on developing and improving the technology that enables an ego vehicle's autonomy system to reliably perform perception, there is also a need for technology that allows for evaluation of an autonomy system's perception performance, so that developers of such technology are able to see how a newly-developed version of perception technology is performing, compare the performance of multiple different versions of perception technology, and ultimately make a decision as to which version(s) of perception technology should be deployed. However, existing technology for evaluating the performance of perception technology has several limitations that make it difficult for developers to perform these tasks with confidence.

Indeed, in order to evaluate the performance of perception technology today, ego vehicles having autonomy systems provisioned with a particular version of perception technology may be sent out on collection runs (sometimes referred to as missions) during which each such ego vehicle collects data on a frame-by-frame basis. The collected data for each such frame comprises a sensor dataset captured by the ego vehicle and corresponding perception, prediction, and planning datasets derived by the ego vehicle at a particular snapshot of time during the ego vehicle's collection run. In this respect, the perception dataset that is derived by an ego vehicle for each frame encodes a relatively limited set of information for each object detected within the frame that typically comprises (i) an identifier of the detected object, (ii) a class of the detected object as determined by the perception technology, and (iii) a snapshot of the detected object's current state as determined by the perception technology (e.g., a current position, velocity, and acceleration of the detected object).

Further, in some examples, a previously-captured sensor dataset may be run through several different versions of an ego vehicle's autonomy system in respective offline, simulated missions. This may result in corresponding perception, prediction, and planning datasets for each frame within each simulated mission, as discussed above.

In turn, each ego vehicle's collected data and any simulated collection data is uploaded to a remote computing system, which typically separates out an ego vehicle's sensor datasets, perception datasets, prediction datasets, and planning datasets and then stores these different dataset types into different databases. For example, the frame-by-frame sensor datasets that were captured by an ego vehicle during its mission may be separated out and stored into a sensor database, the frame-by-frame perception datasets that were derived by an ego vehicle during its mission may be separated out and stored into a perception database, the frame-by-frame prediction datasets that were derived by an ego vehicle during its mission may be separated out and stored into a prediction database, and the frame-by-frame planning datasets that were derived by an ego vehicle during its mission may be separated out and stored into a planning database. As part of this operation, the remote computing system may also associate each dataset being stored with an identifier of the ego vehicle and a frame timestamp, such that the relationship between a given ego vehicle's sensor datasets, perception datasets, prediction datasets, and planning datasets is maintained on a frame-by-frame basis after storage.

Once each ego vehicle's collected data is uploaded and stored, it is currently possible to perform some limited evaluation of perception performance using this collected data. In practice, this evaluation typically involves (i) selecting a sampling of perception datasets that were derived using the perception technology under evaluation, (ii) accessing the sensor datasets that correspond to the selected perception datasets, (iii) presenting the sensor datasets to humans that are tasked with reviewing and labeling the sensor datasets with information regarding the objects that are observed within those sensor datasets, which may be encoded into human-defined perception datasets, and then (iv) comparing the selected sampling of derived perception datasets to their corresponding human-defined perception datasets, which may provide some indication of the performance of the perception technology under evaluation. For instance, if a derived perception dataset encodes information regarding objects within an ego vehicle's surrounding environment during a given frame that is similar to the information encoded in the corresponding human-defined perception dataset (e.g., by identifying the same number of surrounding objects, having similar class assignments for such objects, and having similar state information for such objects), this may be taken as an indication that the perception technology performed in a desirable manner during the given frame. On the other hand, if a derived perception dataset encodes information regarding objects within an ego vehicle's surrounding environment during a given frame that differs in some meaningful way from the information encoded in the corresponding human-defined perception dataset (e.g., by identifying a different number of surrounding objects, having a different class assignment for one or more such objects, and/or having different state information for one or more such objects), this may be taken as an indication that the perception technology performed in a less-than-desirable manner during the given frame.

However, while the foregoing approach provides some means for evaluating perception performance using the perception datasets that are derived and stored today, it will be appreciated that there are also several limitations and drawbacks to the current approach.

First, as noted above, the perception datasets that are derived by ego vehicles today encode a relatively limited set of information for each detected object, which typically comprises (i) an identifier of the detected object, (ii) a class of the detected object as determined by the perception technology, and (iii) a snapshot of the detected object's current state as determined by the perception technology (e.g., a current position, velocity, and acceleration of the detected object). Although this derived object-level information is then fused together with other available information (e.g., map data) to derive a representation of the real-world environment that is used for prediction and planning, such real-world representations generally take the form of composite data structures such as vector-based, parameterized encodings, rasterized 3D images, and the like, which cannot be easily compared, contrasted, and/or categorized. Thus, to the extent that the derived object-level information discussed above is information that can be universally identified across perception datasets (e.g., by indexing it in a database), this limited set of object-level information makes it very difficult to evaluate different perception datasets in a meaningful way. For instance, beyond object class, the information that is encoded within perception datasets being derived and stored today typically cannot be used to compare, contrast, and/or categorize the particular circumstances being faced by ego vehicles during different frames.

For example, it may be the case that a given version of perception technology reliably detects and characterizes objects that are closer to an ego vehicle better than the perception technology reliably detects and characterizes objects that are farther away from the ego vehicle (or vice versa). However, the perception datasets that are derived and stored today do not encode information that enables the perception datasets to be distinguished based on such spatial relationships between within a given frame. As another example, it may be the case that one version of perception technology reliably detects and characterizes unprotected left turn scenarios faced by an ego vehicle better than another version of the perception technology. However, the perception datasets that are derived and stored today do not encode information regarding sequences of frames, which may be referred to as "scenes." These shortcomings limit the ability to intelligently segregate current perception datasets in ways that allow for a more targeted evaluation how the perception technology performed when faced with different circumstances.

Second, in order to evaluate perception performance using the perception datasets that are derived and stored today, these derived perception datasets generally need to be compared to human-defined perception datasets, which means that humans need to review and label the sensor datasets that correspond to the selected sampling of derived perception datasets. However, human review and labeling of sensor datasets is a time consuming and costly endeavor, which places practical limits on how many of the derived perception datasets can actually be evaluated as well as how often such an evaluation can be performed. Indeed, in most cases, only a very small sampling of the sensor datasets captured by ego vehicles can actually be reviewed and labeled by humans before the time and/or cost associated with human review and labeling becomes prohibitive. Because of these practical limitations, the existing approach for evaluating perception performance is time consuming, costly, and may not be as accurate as it could be given that there is a much broader universe of derived perception datasets available for evaluation. Moreover, human-defined perception datasets are still limited in some of the ways discussed above, as they still do not include information characterizing spatial relationships between objects within a frame, or information characterizing sequential or otherwise related of frames.

Figure 1B:
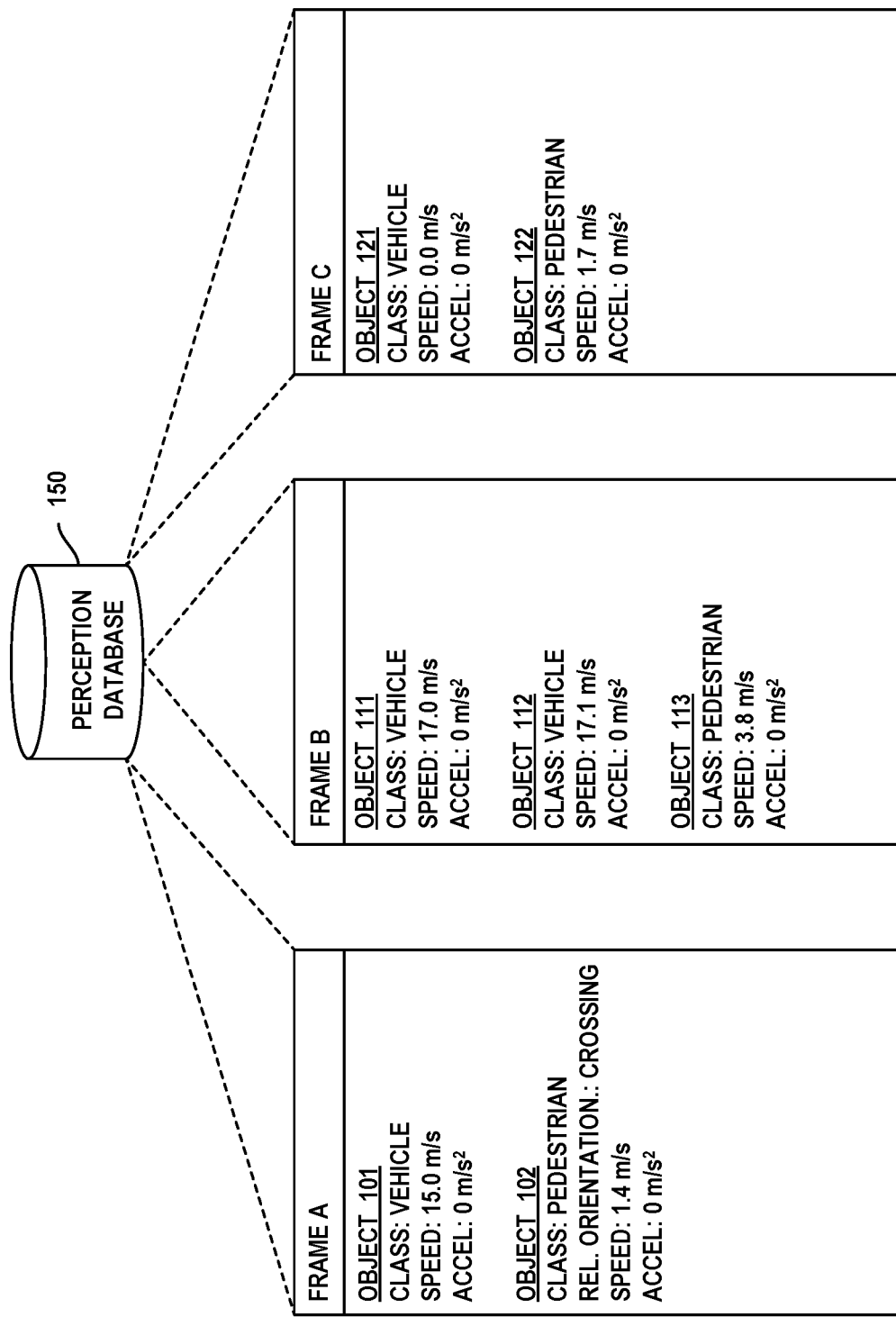
FIG. 1B is a diagram that illustrates the derived perception data for the three points in time shown in in FIG. 1A, in accordance with existing approaches.

FIGS. 1A and 1B illustrate one example of the limitations imposed by perception datasets that are derived and stored today. FIG. 1A shows three frames A, B, and C that represent three different points in time at which an ego vehicle 110 captured sensor data during a collection run. For each frame, ego vehicle 110 employs perception technology to perform a perception operation, which may involve detecting objects within the ego vehicle's surrounding environment and deriving certain information for each object. The resulting perception datasets are subsequently uploaded to a remote computing system and stored in a perception database 150 of the remote computing system, where they may be used for evaluation purposes as discussed above.

As shown in FIG. 1A, the three frames A, B, and C correspond to three different sets of circumstances that ego vehicle 110 encountered during its collection run—including three different sets of objects and three different types of scenarios. For instance, frame A involves pedestrian 102 moving away from a crosswalk in front of ego vehicle 110 and an oncoming vehicle 101 that could potentially make an unprotected left turn in front of ego vehicle 110. Frame B involves lead vehicle 111 in front of ego vehicle 110, another, closer vehicle 112 in an adjacent lane, and pedestrian 113 on an adjacent sidewalk. Frame C involves pedestrian 122 in a crosswalk that crosses the lane of ego vehicle 110 and vehicle 121 at rest at the intersection in a crossing lane.

However, relatively little of the information that characterizes these different types of scenarios that ego vehicle 110 encountered is reflected in the perception database 150. Indeed, as shown in FIG. 1B, the perception dataset derived by the perception technology of ego vehicle 110 for each frame includes a limited set of information for each detected object that includes the object's class and a snapshot of the object's current speed, and current acceleration as perceived by ego vehicle 110. This, in turn, leads to several of the noted shortcomings in using the perception data to evaluate the perception technology running on ego vehicle 110.

For example, given the limited nature of the perception datasets stored in perception database 150, it is not possible to distinguish between the perception datasets based on the different types of scenarios being faced by ego vehicle 110 when such perception datasets were derived, which means that the remote computing system is unable to engage in more targeted evaluations of the perception technology's performance. For instance, as noted above, frames A, B, and C involve three different types of scenarios, but the perception datasets stored in perception database 150 do not encode any information that enables the remote computing system to distinguish frames A, B, and C based on these different types of scenarios. As a result, the remote computing system is unable to engage in targeted evaluations of how the perception technology running on ego vehicle 110 performs in each of these different types of scenarios.

As another example, in order to evaluate the performance of the perception technology running on ego vehicle 110 using the perception datasets stored in perception database 150, the remote computing system would need to (i) select a sampling of the perception datasets stored in perception database 150, (ii) access the stored sensor datasets that correspond to the selected perception datasets, (iii) present the accessed sensor datasets to humans that are tasked with reviewing and labeling the sensor datasets with information regarding the objects that are observed within those sensor datasets, which may be encoded into human-defined perception datasets, and then (iv) compare the stored perception datasets to these human-defined perception datasets. However, as noted above, this human labeling is time consuming and costly. Moreover, because there is a practical limit on how many sensor datasets can be reviewed and labeled by humans for purposes of evaluation, it is also likely that the evaluation will not capture the full extent of different scenarios types that could be encountered by ego vehicle 110—which may lead to biased results that do not provide an accurate indication of how the perception technology is likely to perform in the real world.

In addition to using the data collected by ego vehicles to evaluate the performance of perception technology, such collected data may also be used to help develop and/or improve perception technology. For example, perception technology may incorporate machine learning models that are configured to detect, classify, and/or characterize objects in an ego vehicle's surrounding environment—which may be referred to herein as "object-recognition models"—and the process of creating these object-recognition models typically involves (i) selecting a sampling of sensor datasets captured by ego vehicles, (ii) presenting the sensor datasets to humans that are tasked with reviewing and labeling the sensor datasets with information regarding the objects that are observed within those sensor datasets, and then (iii) applying a machine learning technique to the labeled sensor datasets in order to train such object-recognition models. As another example, perception technology may incorporate machine learning models that are configured to detect and classify certain types of scenarios that could potentially be faced by an ego vehicle while operating in real-world environment—which may be referred to herein as "scenario-type models"—and the process of creating these scenario-type models typically involves (i) selecting a sampling of sensor datasets captured by ego vehicles, (ii) presenting the sensor datasets to humans that are tasked with reviewing and labeling the sensor datasets with information regarding which scenario type(s) were being faced at the time that the sensor datasets were captured, and then (iii) applying a machine learning technique to the labeled sensor datasets in order to train such scenario-type models. It may be possible to use the data collected by ego vehicles to help develop and/or improve perception technology in other ways as well.

Notably, when creating machine learning models such as these, there would be value in having access to more detailed information regarding the circumstances being faced by the ego vehicles when the sensor datasets were captured by such ego vehicles, such as the types of scenarios being faced by the ego vehicles. For instance, having access to this type of information would allow for a more intelligent selection of which sensor datasets are used for model training, which may have benefits for both object-recognition models and scenario-type models. Indeed, an object-recognition model generally exhibits better performance when it has been trained using sensor datasets that were balanced across a diversified sampling of scenario types that were faced by the ego vehicles, and this balancing would be facilitated by having access to information regarding which scenario types were being faced by the ego vehicles when the sensor datasets were captured. Likewise, the selection of which sensor datasets to use when training different scenario-type models would be facilitated by having access to information regarding which scenario types were being faced by the ego vehicles when the sensor datasets were captured. However, given the limited nature of the perception datasets that are derived and stored today, this type of information is not readily available. This is demonstrated in FIG. 1B. As a result, existing approaches for creating the machine learning models that are incorporated into perception technology continue to rely heavily on human review and labeling of sensor datasets, and thus suffer from all of the drawbacks discussed above—namely, that such approaches are time consuming, costly, and have practical limits on how many of the sensor datasets can be used for training, which may degrade the accuracy of such machine learning models.

To help address these and other limitations imposed by the perception datasets that are derived and stored today, disclosed herein is a pipeline for augmenting derived perception data to include "supplemental information" that provides additional details beyond what is currently included in the derived perception data regarding the objects, frames, and/or scenes therein. The augmentation of perception datasets with such supplemental information may enhance the usability of the perception data for tasks such as evaluation of perception performance or development of new perception technology.

The supplemental information discussed herein may take various forms. As one example, the supplemental information may include object-level geometric information for each detected object that provides additional details regarding the spatial relationship between the detected object and the ego vehicle. This type of object-level geometric information may enhance the ability to compare, contrast, and/or categorize detected objects, as well as the frames and scenes in which such objects were detected.

As another example, the supplemental information may include object-level semantic information for some or all of the detected objects in a perception dataset, which may provide additional details regarding spatial and/or behavioral relationships between detected objects and the surrounding environment. This type of object-level semantic information may also enhance the ability to compare, contrast, and/or categorize detected objects, as well as the frames and scenes in which such objects were detected.

As will be discussed further below, the augmented perception data may be arranged in such a way that the supplemental object-level information may augment the perception data at a frame- and scene-level as well. For instance, one or more frames may be characterized by certain supplemental object-level information for one or more objects within the one or more frames. Similarly, a given scene may be characterized by certain supplemental object-level information for one or more objects within the one or more frames that make up the given scene. Nonetheless, in some embodiments, supplemental frame-level and scene-level information may also be directly derived.

Figure 2:
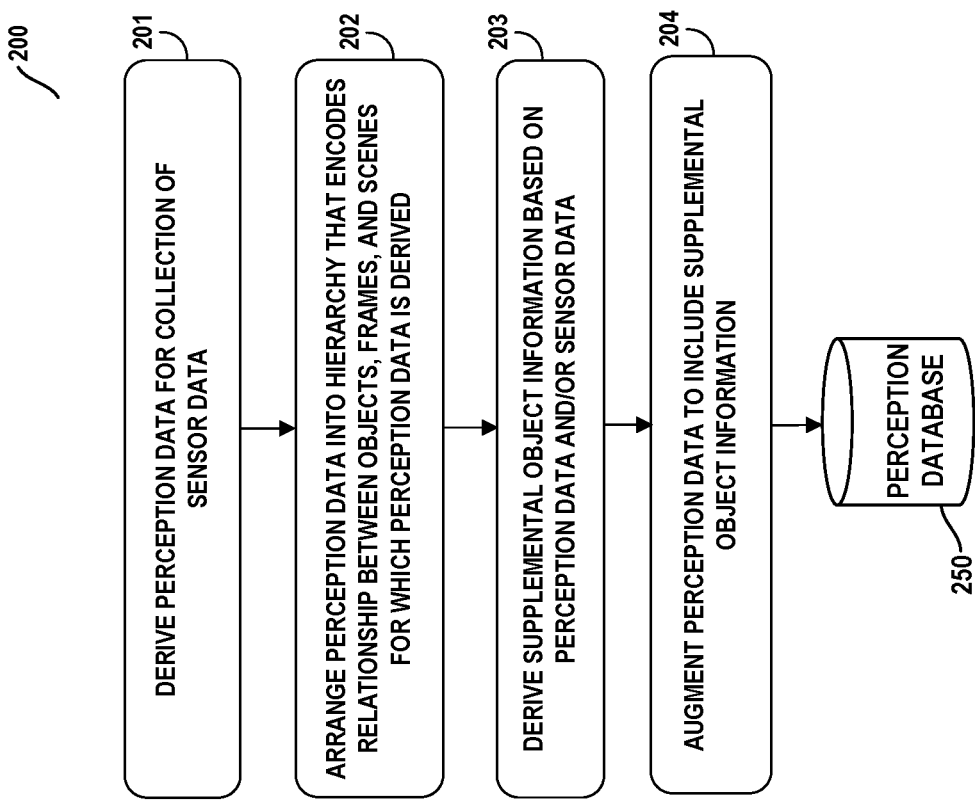
FIG. 2 is a simplified block diagram that illustrates an example embodiment of augmenting perception data carried out in accordance with the present disclosure.

Turning now to FIG. 2 a functional block diagram is provided that illustrates one example embodiment of a pipeline 200 for augmenting derived perception data with supplemental object information. In this regard, the example operations described below may be carried out by one or more computing systems, such as a remote computing system. However, it should be understood that other computing systems, such as an on-board computing system of an ego vehicle, may perform one or more of the example operations. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

At block 201, the pipeline 200 includes deriving perception data for a given collection of sensor data. In line with the discussion above, the perception data may include derived information for each object detected within the sensor data (e.g., object class and state information), and may be derived by an ego vehicle's autonomy system as the ego vehicle operates in a real-world environment or by an offline computing system running a simulated mission. Further, the perception data derived at block 201 may also include human-defined perception datasets, such as perception datasets in which object class information has been assigned by a human. In this regard, and as will become apparent in the following discussion, the pipeline 200 is not limited to augmenting machine-derived perception data.

At block 202, the pipeline 200 includes arranging the derived perception data into a hierarchy that encodes the relationship between the objects, frames, and scenes for which the perception data is derived. For instance, the derived perception data may comprise a sequence of frame-specific perception datasets, wherein each frame-specific perception dataset comprises a respective object-specific dataset for each object detected within the frame. The object-specific datasets may include certain derived information about the object (e.g., object class, position, orientation, velocity, acceleration, etc.). Additionally, the sequence of frame-specific perception datasets may also be segmented into contiguous windows of multiple frame-specific perception datasets that each correspond to a different respective "scene" within the derived perception data. Thus, the perception data related to each scene may take the form of a nested hierarchy having a top "scene" level that encodes information about the scene (e.g., a scene identifier and an identification of the frames included in the scene), a middle "frame" level that encodes information about each frame included in the scene (e.g., a frame identifier, a frame timestamp, and an identification of the observed objects for each frame), and then a bottom "object" level that encodes the information about each object observed in each respective frame included in the scene.

Figure 3A:
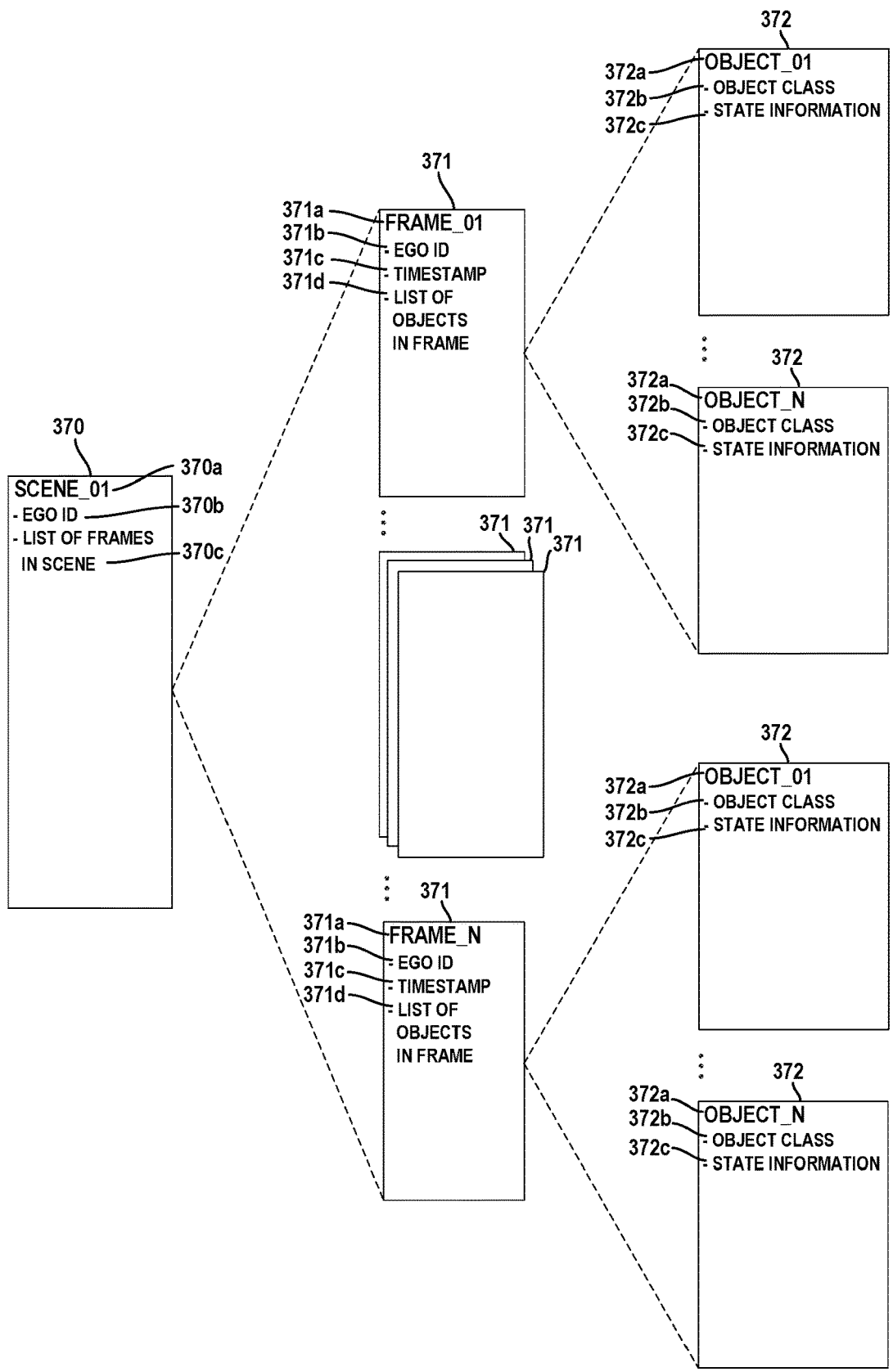
FIG. 3A is a diagram that illustrates a perception data hierarchy in accordance with the present disclosure.

FIG. 3A illustrates one example arrangement of derived perception data as discussed above, which shows perception data for a single scene. As shown, FIG. 3A depicts a hierarchy that include a top-level scene node 370 that includes scene-level data such as a scene identifier 370a, an ego ID 370b that identifies the ego vehicle that derived the perception data (e.g., a vehicle identifier and a version number for the ego vehicle's perception technology), and an indication 370c of the frames included within the scene. Within scene node 370 may be nested a plurality of frame nodes 371 that each represent a separate snapshot of time for which perception data was derived from the corresponding sensor data. Each frame node 371 may include frame-level data such as a frame identifier 371a, an ego ID 371b, a timestamp 371c, and an indication 371d of the objects included within in the frame. In turn, within each individual frame node 371 is nested a respective object node 372 for each object detected within the frame, each of which may include an object identifier 372a and other object-level data that was derived for the detected object at that particular snapshot in time, including the object's class 372b and state information 372c, among other possibilities.

Other organizational structures for the perception data are also possible.

In some implementations, the arrangement of perception data discussed at block 202 and shown by way of example in FIG. 3A may be performed on by an on-vehicle computing system, which may operate as part of an ego vehicle's autonomy system. In some other implementations, the perception data derived by an ego vehicle's autonomy system may include only object-level data and associated timestamps indicating when such data was captured by the ego vehicle. In turn, the perception data may be uploaded to a remote computing system, and the remote computing system may use the timestamps to organize the object data into separate frames that correspond to individual snapshots in time and then organize the frames into one or more scenes based on one or more additional criteria. Other possibilities also exist, including examples in which the arrangement of perception data to encode the scene, frame, and object-level relationships contemplated herein is accomplished by a combination of on-vehicle and off-vehicle computing systems.

Based on the relationship between the different levels of perception data shown in FIG. 3A, the derived object-level data for objects detected during a given frame may provide an indication of certain frame-level information. Examples of such frame-level information may include spatial information regarding the real-world environment perceived by the ego vehicle at a given point in time, such as how many pedestrians an ego vehicle encountered at a given point in time, or an indication of points in time at which the ego vehicle encountered both a pedestrian and a cyclist. Other examples of frame-level information are also possible. Similarly, the derived object-level data for objects detected within the frames across a scene may provide an indication of certain scene-level information. Examples of such scene-level information may include temporal information regarding the real-world environment perceived by the ego vehicle during a given window of time, such as how long a vehicle maintained a given speed. Other examples of scene-level information are also possible.

Returning to FIG. 2, at block 203, the pipeline 200 includes deriving supplemental object information based on the derived perception data, the captured sensor data, or both. For instance, the captured sensor data may include data sources that are used by the autonomy system of an ego vehicle during its operation, such as geometric and semantic map data and vehicle localization information. Accordingly, the supplemental object information may be derived from at least these sources within the sensor data.

The supplemental information that is derived at block 203 may take various forms. As one possibility, the supplemental information may include object-level data that indicates additional geometric properties and/or details regarding spatial relationships of an object relative to the ego vehicle. This object-level geometric data may take the form of one or more tags, and may include an object's distance from the ego vehicle and an object's angle relative to the heading of the ego vehicle, among other possibilities.

As another possibility, the supplemental information may include object-level data that indicates additional semantic properties of an object. Such information may provide additional details regarding spatial and/or behavioral relationships between detected objects and the surrounding environment. There are numerous examples of such semantic properties that may be derived for a given object, and may take the form of one or more tags including: Object lane position (either absolute or relative to ego); Object lane change status (value is binary YES/NO, indicating whether or not an object is changing lanes); Object lead vehicle status (value is binary YES/NO, indicating whether or not an object is leading the ego vehicle in the same lane, traveling in the same direction); Object crosswalk status (value is binary YES/NO, indicating whether or not an object is located in a crosswalk); Object cut-in status (value is binary YES/NO, indicating whether or not an object in an adjacent lane is changing lanes into the ego vehicle lane, in front of the ego vehicle); Object should yield (value is binary YES/NO, indicating whether the object should yield to the ego vehicle based on established driving conventions); Ego should yield (value is binary YES/NO, indicating whether the ego vehicle should yield to the object based on established driving conventions); and Drivable surface (value is binary YES/NO, indicating whether or not an object is located on a drivable surface, such as a road). Various other semantic properties may be derived.

In some embodiments, the supplemental object-level information discussed herein may be derived by a remote computing device after the perception and/or sensor datasets are uploaded from the ego vehicle. In this regard, the remote computing device may include a tagging engine that derives the supplemental information based on the perception data and/or the sensor data. It is also contemplated that the tagging engine may be executed by an on-board computing system of the ego vehicle, in which case the tagging engine may be included as part of (or otherwise interface with) the ego vehicle's autonomy system. Various other implementations for the tagging engine are also possible, including the possibility that the functionality of the tagging engine may be distributed between on-board and remote computing systems.

At block 204, the pipeline 200 involves augmenting the perception data to include the supplemental object-level information. This operation may be carried out by the tagging engine and may include tagging or otherwise appending the perception data such that it becomes encoded with the supplemental object-level information.

Figure 3B:
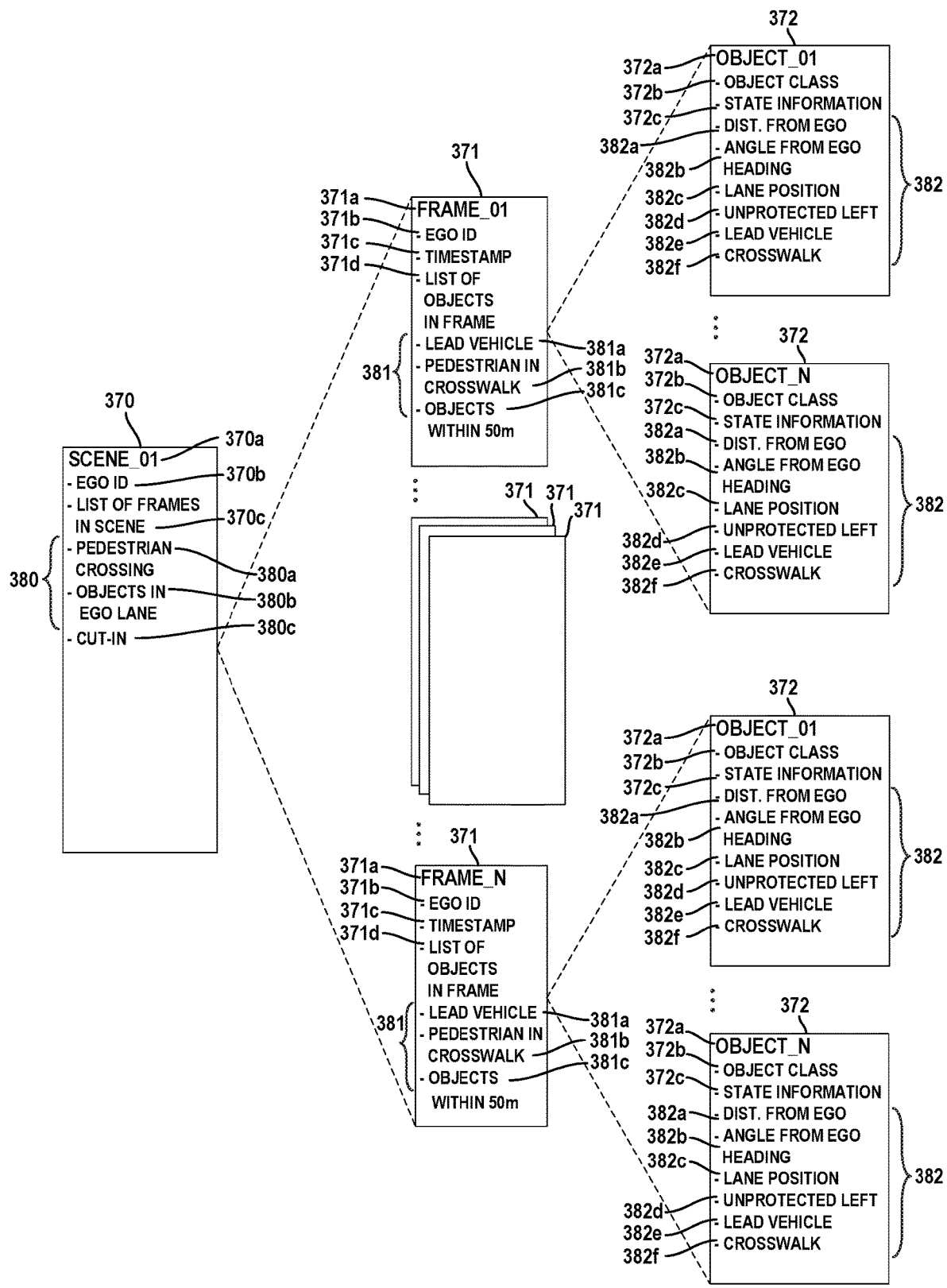
FIG. 3B is a diagram that illustrates an augmented perception data hierarchy in accordance with the present disclosure.

As one example, FIG. 3B provides an illustration of the perception data hierarchy previously shown in FIG. 3A after the perception data has been augmented with supplemental information derived by the tagging engine. As shown in FIG. 3B, each object node 372 within the perception data hierarchy has been augmented with a set of supplemental object-level information 382 in addition to the derived perception data that was shown in FIG. 3A. The supplemental object-level information in FIG. 3B takes the form of object-level tags that provide additional geometric or semantic information about the object in accordance with the examples discussed above. For instance, supplemental object-level tags 382a and 382b provide supplemental geometric information regarding each object relative to the ego vehicle, and supplemental object-level tags 382c, 382d, 382e, and 382f provide supplemental semantic information regarding each object.

Notably, augmenting the perception data with the supplemental object-level information 382 may enhance the perception data with further detail regarding the geometric and/or semantic characteristics of the objects observed during the ego vehicle's collection run, which may provide further insight into the circumstances being faced by the ego vehicle (e.g., the type of scenario) within the frames in which such objects were observed as well as the scenes in which these frames are included. In this way, the supplemental object-level information 382 may collectively serve to provide additional spatial and/or temporal information about the real-world environment that was being perceived by the ego vehicle during its collection run, which may enhance the ability to compare, contrast, and/or categorize the detected objects as well as the frame and scenes in which such objects were detected.

For example, if the perception data is augmented to include an object-level tag indicating that an object with a derived object class of "pedestrian" detected during a given frame was located in a crosswalk, this object-level information may serve as an indication that the ego vehicle was facing a "pedestrian in a crosswalk" type of scenario during the given frame, as well as the scene in which the given frame is included. As another example, augmenting the perception data to include a series of object-level tags, over a given series of frames, indicating that a vehicle changed lanes from an adjacent lane into the ego vehicle's lane may serve as an indication that the ego vehicle was facing a "vehicle cut-in" type of scenario during the given series of frames, as well as the scene in which the given frames are included. Numerous other examples are also possible.

It will be appreciated that this ability to provide further insight regarding the frames and/or scenes observed within the perception data using the supplemental object-level information 382 is made possible because the perception data encodes the relationship between the objects, frames, and scenes observed during the ego vehicle's collection run, as shown in FIG. 3B (e.g., by using a nested hierarchy to indicate which object datasets correspond to each respective frame and which frames correspond to each respective scene). Thus, by leveraging the encoded relationship between the objects, frames, and scenes observed during the ego vehicle's collection run, the disclosed technique is able to provide spatial and/or temporal information about the real-world environment that was being perceived by the ego vehicle without augmenting the perception data with information that is specific to the frames or scenes observed during the ego vehicle's collection run.

Nevertheless, in some implementations, the tagging engine may additionally function to derive supplemental information that is specific to the frames and/or scenes observed during the ego vehicle's collection run. Deriving this type of "supplemental frame-level information" and/or "supplemental scene-level information" and then augmenting the perception data therewith may provide additional detail regarding the collection of objects detected during a given frame, as well as additional detail regarding the collection of objects detected across a sequence of related frames. In this respect, the function of augmenting the perception data to include such frame-level and/or scene-level supplemental information may take various forms, including the possibility that the frame-level and/or scene-level supplemental information may be encoded into frame-level and/or scene-level tags that are associated with the frame-specific and scene-specific perception datasets (e.g., by adding such tags to the frame level of the perception data's nested hierarchy).

This can be seen in FIG. 3B, which shows a set of supplemental frame-level information 381 for each frame node 371, including example frame-level tags that may provide additional spatial information regarding multiple objects within a given frame. As some examples, the supplemental frame-level information 381 may include frame-level tag 381a indicating whether the frame includes an object identified as a lead vehicle (value is binary YES/NO); a frame-level tag 381b indicating whether the frame includes a pedestrian that is located in a crosswalk (value is binary YES/NO); and a frame-level tag 381c indicating a total number of objects in the frame that are within 50 meters of the ego vehicle. As another example, a frame-level tag may indicate a total number of objects in a given frame having a particular type of semantic location (e.g., in a crosswalk, or in the ego vehicle's lane). As yet another example, some frame-level tags may provide an indication of whether a given frame is included in a scenario of interest. For instance, a frame may be tagged to indicate its cut-in status (value is binary YES/NO), which identifies whether the frame includes an object that is engaged in a cut-in scenario.

Similarly, FIG. 3B shows a set of supplemental scene-level information 380 for the scene node 370, including example scene-level tags that may provide additional temporal information across multiple frames within the scene. As some examples, the supplemental scene-level information 380 may include a scene-level tag 380*a* indicating whether the scene includes a pedestrian crossing a crosswalk (value is binary YES/NO); a scene-level tag 380*b* indicating a total number of objects across a scene having a particular type of semantic location (e.g., in the ego vehicle's lane). As another example, some scene-level tags may provide an indication of whether a given scene is included in a scenario of interest, similar to the object-level and frame-level tags noted above. For instance, a scene-level tag 380*c* may indicate the scene's cut-in status (value is binary YES/NO), which identifies whether the scene includes frames with a positive status for a cut-in scenario. Numerous other examples are also possible.

Returning to FIG. 2, once the perception data is augmented by the tagging engine, the augmented perception data may be stored in a perception database 250. The perception database 250 may be located at the remote computing system that executed the tagging engine and/or some other computing system (e.g., an evaluation platform). Thereafter, the perception database 250 may facilitate the execution of query requests using the supplemental information to extract data from the perception database 250 in ways that were not previously possible using the more limited set of data that is stored in perception databases today, which in turn enables new ways to evaluate the performance of perception technology as well as new ways to build a training dataset for training or tuning perception-related machine learning models. Such examples will be discussed in greater detail below.

Further, the perception database 250 provides for a universal index of perceived obstacles that may otherwise originate from different sources, including perception datasets perceived by an ego vehicle, perception datasets obtained via simulation, or human-defined perception datasets. Because each of these types of perception datasets may be augmented with supplemental information as discussed herein, the perception database 250 represents an efficient source form which to query across all of these perception datasets for objects, scenarios, and other perception data of interest.

Figure 4:
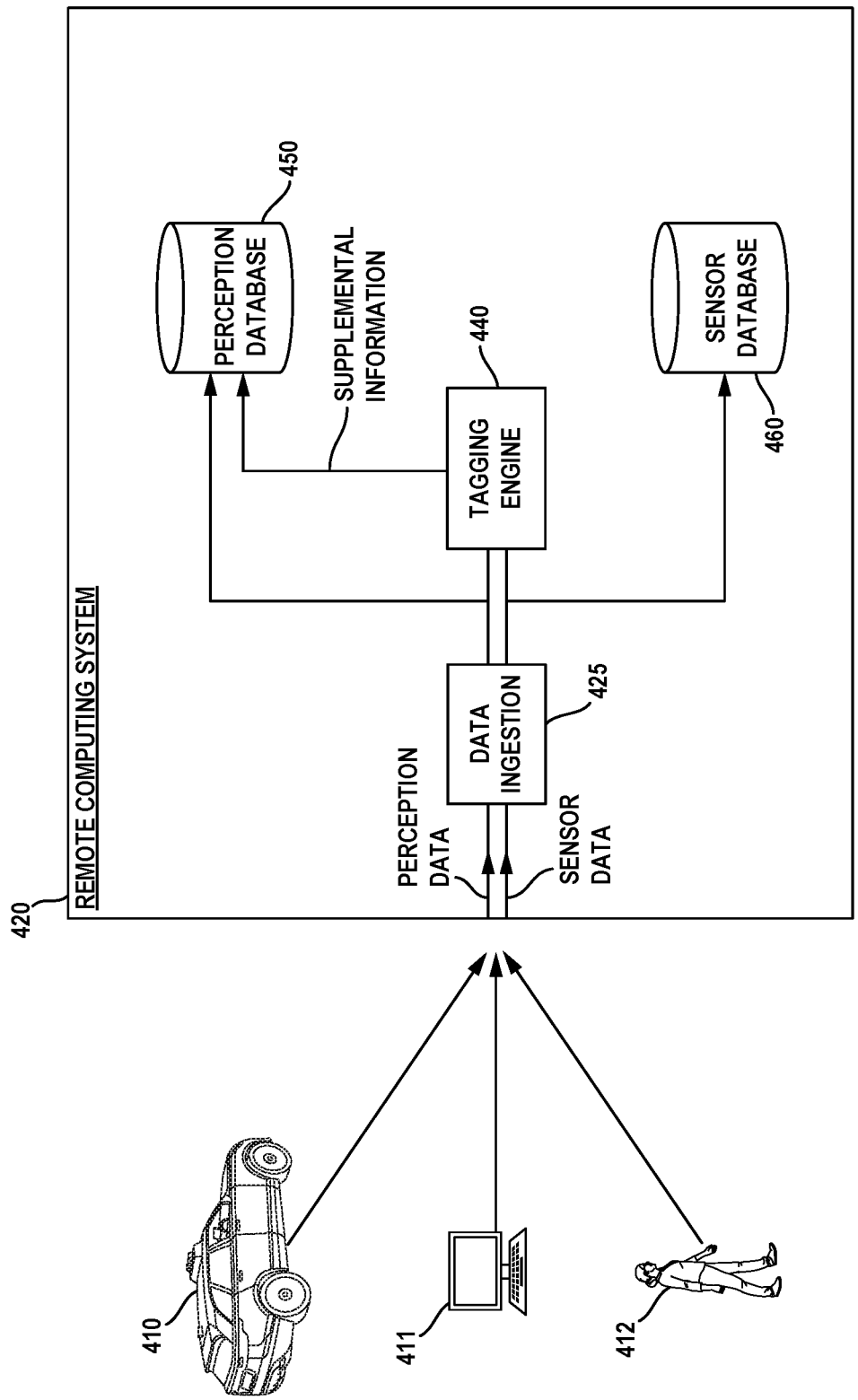
FIG. 4 is a simplified block diagram that illustrates an example embodiment of a remote computing system and data flow in accordance with the present disclosure.

Turning now to FIG. 4, one example implementation for executing the pipeline 200 of FIG. 2 is shown. According to FIG. 4, there are multiple possible sources for the derived perception data that will be augmented. For example, an ego vehicle 410 operating in a real-world environment may capture sensor data including a sensor dataset for each frame in a sequence of frames and may derive perception data including a corresponding perception dataset for each frame in the sequence of frames. As another example, a computing device 411 may derive perception data in a simulated collection run that is based on previously captured sensor data. As yet another example, human-defined perception datasets (represented by the human 412) that are based on previously captured sensor data may be augmented by the pipeline 200. Other sources of perception data are also possible.

In FIG. 4, regardless of the source, the derived perception data and associated sensor data may be transferred to a remote computing system 420. The transfer may take place via one or more wired or wireless data networks or via a point-to-point connection with ego vehicle 410, among other possibilities. The remote computing system 420 may include a data ingestion tool 425 that processes and prepares the incoming sensor data and derived perception data for use by the other components of remote computing system 420. In some implementations, data ingestion tool 425 may perform some or all of the data arrangement operation(s) discussed above with respect to block 202, in situations where the perception data being received from ego vehicle 410 is not already pre-arranged. In other implementations, the arrangement operations may be performed by other components of remote computing system 420.

After data ingestion, remote computing system 420 may pass the sensor data and the derived perception data to tagging engine 440. In some examples, remote computing system 420 may also store a copy of the sensor data in sensor database 460 and may store a copy of the derived perception data in perception database 450, which may correspond to the perception database 250 shown in FIG. 2. As noted above, the example data flow shown in FIG. 4 represents just one possible implementation of the operations discussed herein. Numerous other arrangements for how the perception data and/or sensor data may flow into tagging engine 440 are also possible.

As shown in FIG. 4, tagging engine 440 may derive supplemental object-level (and possibly supplemental frame- and scene-level) information as generally discussed above with respect to block 203, and then may augment the derived perception data with the supplemental information, as discussed above with respect to block 204. The augmented perception data may be stored in perception database 450, which is shown as a part of remote computing system 420 in FIG. 4. However, other arrangements are also possible in which perception database 450 is separate from one or both of remote computing system 420 and tagging engine 440.

In some embodiments, the perception data that is received from ego vehicle 410 may be stored in perception database 450 before it is augmented by the supplemental object-level information derived by tagging engine 440. In this regard, augmenting the perception data may involve adding to or otherwise updating the previously-stored perception data with the supplemental object-level information. In other embodiments, the perception data may be augmented elsewhere by remote computing system 420 (e.g., within tagging engine 440) before it is stored in perception database 450, such that the perception data is in its augmented form when it reaches perception database 450.

The augmented perception data in perception database 450 may provide for the ability to execute queries on perception database 450 that are based at least in part on the supplemental information contained therein in order to extract data from the database 250 in ways that were not previously possible, facilitating new tasks for the evaluation of perception performance or development of new perception technology.

The types of tasks for evaluation of perception performance or development of new perception technology that are enabled by the augmented perception data, and the corresponding queries that may identify the data for accomplishing such tasks, may take various forms. In general, three such tasks and the corresponding queries will be discussed herein, including (i) the creation of derived performance metrics to evaluate perception performance over broad sets of sensor data, (ii) the targeted evaluation of perception performance in particular scenarios, and (iii) the building of improved datasets to be used for model training. Each will be discussed in turn.

First, the supplemental information within perception database 450 may allow for queries to be run that isolate on a given perception event, the occurrence of which (e.g., the rate at which the event occurs) may be indicative of perception performance. For instance, some perception events that may be identified using the supplemental information may be indicative of inconsistencies or other errors in the perception operation. Because it may be desirable to reduce the occurrence of such events, determining how often the event occurred within a perception dataset may provide a measure of the effectiveness of the perception technology that was in use by ego vehicle 410.

Deriving such "performance metrics" directly from the augmented perception data may provide numerous advantages over existing options for perception evaluation. Foremost, the derived performance metrics discussed herein do not require any human labeling of sensor data, and thus the substantial expense in both time and labor associated with such labeling can be avoided. Further, because human labeling is not required, it is also not necessary to limit the evaluation to a subset of the perception data. Rather, much larger perception datasets may be evaluated in this way. For instance, a query may be executed over all frames of perception data that were derived using a given version of perception technology, at different times and by multiple ego vehicles and/or simulations.

One possible perception event that may lend itself to a derived performance metric of this kind is the occurrence of so-called "phantom objects." Phantom objects refer to objects that are temporarily perceived by the ego vehicle's perception operation (e.g., for only a few frames) when no real-world object is actually present, and may be caused by LIDAR data or other sensor data that briefly detects dust, water, or other artifacts within the ego vehicle's environment. The occurrence of phantom objects, particularly within a given vicinity of ego vehicle 410 (e.g. within 50 meters), may be detrimental to the autonomy operations of ego vehicle 410, as they may cause ego vehicle 410 to make predictions for, plan for, and potentially take actions that account for the phantom objects, when such operations are not necessary.

Based on these considerations, a query of perception database 450 may be executed that returns, for one or more scenes, the number of objects that existed for five frames or less, and which were also located within 50 meters of ego vehicle 410. The result of the query may be a number representing the occurrence rate of phantom objects for the perception technology in question, which may be normalized as an occurrence rate over a baseline number of frames. This number may then be used as a metric for evaluating and comparing different versions of the perception technology.

Figure 5A:
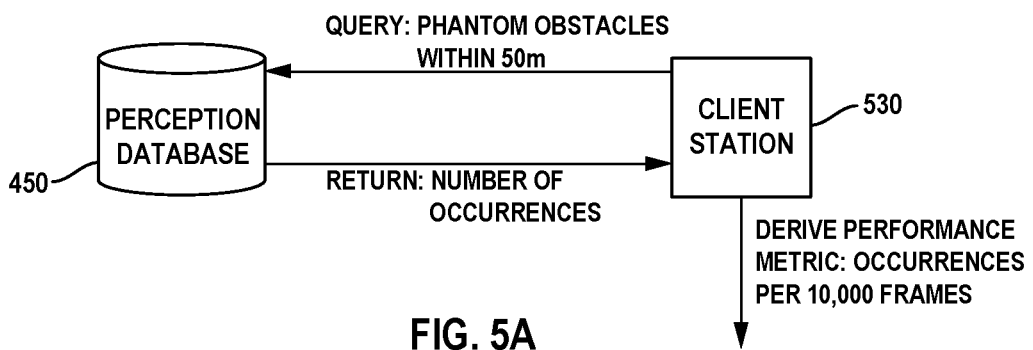
FIG. 5A is a simplified block diagram that illustrates an example query of a perception database in accordance with the present disclosure.

FIG. 5A shows an example of the query discussed above, in which a query to identify the occurrence of phantom obstacles for all perception frames observed by a given version of perception technology is originated by a client station 530. Numerous other devices may originate such a query as well. For instance, remote computing system 420 may originate the query, and may further execute the query in examples where perception database 450 is a part of remote computing system 420. Other arrangements are also possible.

As shown in FIG. 5A, the client station 530 may derive a performance metric based on the returned number of occurrences of phantom obstacles within the perception data. For instance, based on the total number of perception frames that were observed by a given version of perception technology, the client station may determine a performance metric for that version of the perception technology that is expressed as a number of phantom obstacles that occur per 10,000 frames.

It should be noted that the augmented perception data stored in perception database 450 enables the above query for phantom objects in two different respects that may not be possible with current systems. First, because tagging engine 440 derived supplemental geometric data for each object in the perception data and tagged the perception data accordingly, the query can be limited to phantom objects that occur within a 50-meter radius from ego vehicle 410, which may be most relevant to perception performance. Second, the hierarchical structure of the perception data shown in FIG. 3B, in which the supplemental object-level tags give rise to supplemental frame- and scene-level information, allows for the query to search temporally across sequences of frames (e.g., a series of five-frame sequences) within each scene of the perception data.

Figure 5B:
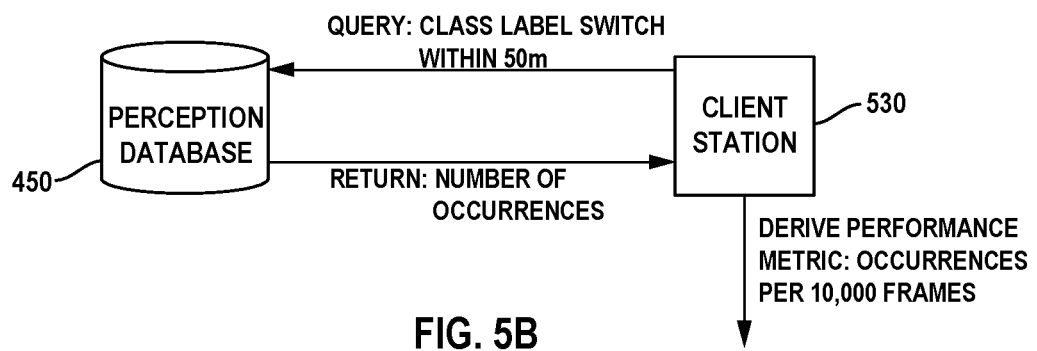
FIG. 5B is a simplified block diagram that illustrates another example query of a perception database in accordance with the present disclosure.

FIG. 5B illustrates a similar query for another type of perception event that may lend itself to a derived performance metric of this kind, namely, the occurrence of class label switches. Class label switches refer to a perception event in which the ego vehicle's perception operation derives a class label for a given object at a first point in time, then derives a different class label for the object at a second point in time, which may be brief (e.g., for a few frames), and then derives the original class label for the object again at a third point in time. One example of a class label switch may include an object that the ego vehicle's perception operation first perceives as a cyclist, then briefly perceives as a pedestrian before perceiving it as a cyclist again. As with phantom objects, although a class label switch may be a brief and temporary occurrence, it may nonetheless cause ego vehicle 410 to make predictions for, plan for, and potentially take actions that account for the mislabeled object, when such operations are not necessary.

Accordingly, client station 530 initiates a query to identify, for all perception frames observed by a given version of perception technology, the number of objects whose class label changed from a first value to a second value and then back to the first value again within 50 frames or less, and which were also located within 50 meters of ego vehicle 410. The result of the query may be a number representing the occurrence rate of class label switches for the given version of perception technology in question. Similar to the derived metric for phantom objects, this number may be normalized over a baseline number of frames, such as 10,000 frames, resulting in a performance metric for the given version of the perception technology (e.g., PerceptionV.1). This performance metric can then be used as a basis for evaluating and comparing different versions of the perception technology. For example, the same query may be run for all perception frames observed by a different version of the perception technology (e.g., PerceptionV.2), and then the two results may provide a means for evaluating and/or comparing the performance of the perception technology over different versions.

Figure 5C:
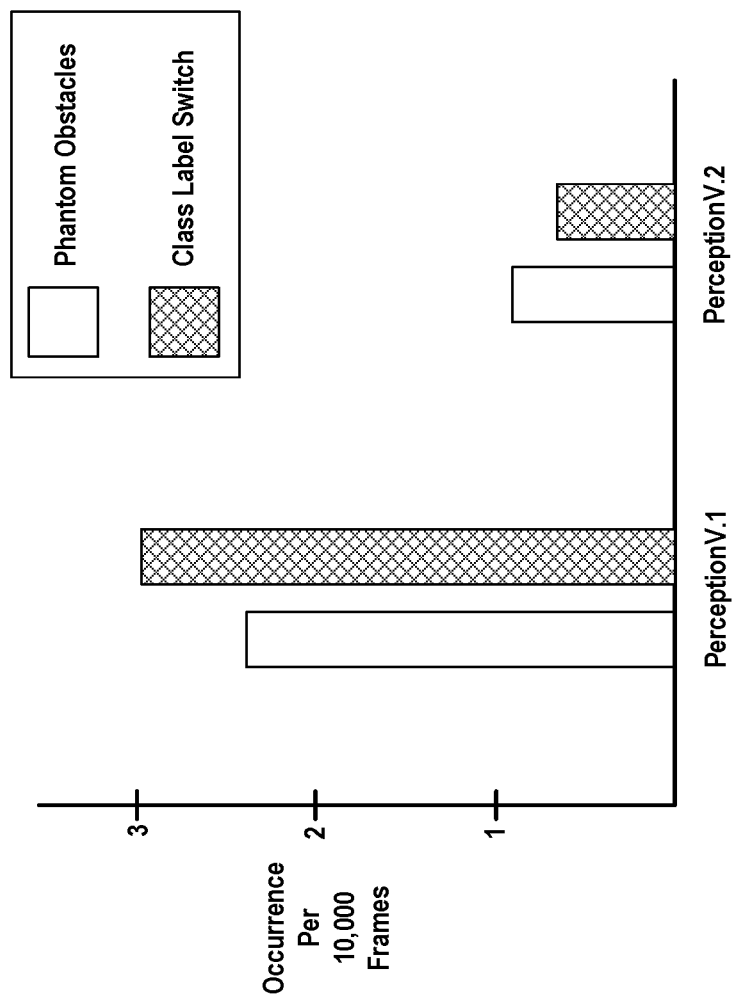
FIG. 5C is a diagram that illustrates evaluation of different versions of perception technology using derived metrics in accordance with the present disclosure.

For example, FIG. 5C illustrates a graph showing an evaluation of different versions of perception technology using derived performance metrics, as discussed above. The x-axis of FIG. 5C shows two different versions of a perception technology that may be deployed by ego vehicles, which are labeled as PerceptionV.1 and PerceptionV.2. Two different performance metrics are represented as bar graphs for each perception version, Phantom Obstacles and Class Label Switches, and are plotted against the y-axis which measures an occurrence per 10,000 frames. As can be seen from FIG. 5C, the performance of the perception technology improved between PerceptionV.1 and PerceptionV.2 with respect to both derived performance metrics, as indicated by the reduced occurrence in both cases.

Yet another perception event that may serve as the basis for a derived performance metric relates to the precision with which an ego vehicle's perception operation is able to track objects of interest. In general, an ego vehicle's perception operation may track a given object within its environment such that the perception data reflects a consistent object identifier (e.g. Object_01) for the object across each frame in which the object appears. Thus, a query might be run that returns scenes in which a track for a given object is lost, and then the object is re-identified with a new object identifier (e.g., Object_02). The occurrence rate of such object tracking discontinuities may then be used as metric by which to evaluate of the general tracking precision of a given version of perception technology.

However, certain objects within an ego vehicle's environment may be more important to the ego vehicle's autonomy operations than others, such as a lead vehicle or a pedestrian located in a crosswalk. Thus, it may be desirable to evaluate and improve the perception technology's ability to track these specific objects. Accordingly, the supplemental information within perception database 450—in particular, the semantic tags identifying the semantic location of such objects—may be used to isolate these objects of interest within the tracking query. This, in turn, may provide for yet another derived performance metric by which to evaluate how well the ego vehicle's perception operation is tracking these specific objects of interest.

Numerous other derived performance metrics can be defined that rely on queries of the augmented perception data in perception database 450.

A second task that may be enabled by the augmented perception data in perception database 450 involves the evaluation of perception performance in specific, targeted situations. For instance, it may be desired to evaluate how one or more versions of an ego vehicle's perception technology performs in a specific scenario that ego vehicle 410 may encounter, such as a lead vehicle cut-in scenario. One measure of perception performance in such a scenario may include how accurately each version of perception technology tracks the vehicle that performed the cut-in, among other possibilities.

To accomplish such an evaluation, a query of perception database 450 may request all scenes in which a vehicle located in a lane adjacent to the ego vehicle changed lanes into the ego vehicle's lane, within a given distance threshold (e.g., 10 meters) from ego vehicle 410. This may isolate, from within the augmented perception data, times at which a vehicle cut-in scenario was encountered by ego vehicle 410.

Figure 6:
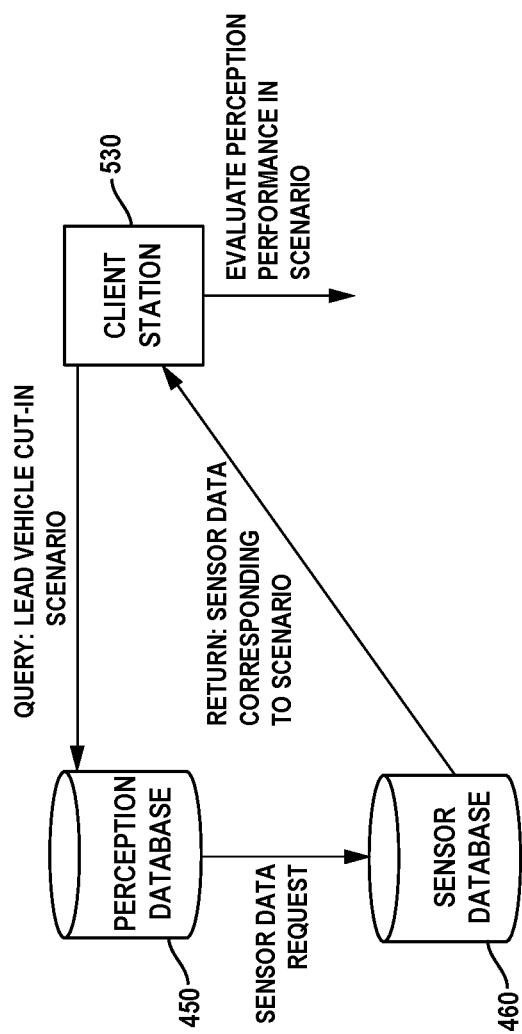
FIG. 6 is a simplified block diagram that illustrates another example query of a perception database in accordance with the present disclosure.

FIG. 6 shows an example of this query, which may originate from client station 530 is shown in FIG. 6. Once the perception data indicating one or more vehicle cut-in scenarios is isolated within perception database 450, perception database 450 and/or remote computing system 420 may facilitate the identification of and request for sensor data from sensor database 460 that corresponds to the frames of perception data returned by the query.

As shown in FIG. 6, such sensor data may be sent to the client station 530. The sensor data may then be manually labeled to establish a baseline for evaluation of perception technology in vehicle cut-in scenarios. Further, this baseline may be used not only to evaluate the perception technology that was deployed when the now-labeled sensor data was captured, but for other versions of the perception technology as well. For example, the sensor data may be run through several different versions of the ego vehicle's perception technology in an offline, simulated drive, and the resulting perception data indicating the vehicle cut-in scenario from each simulated drive may be compared to the human-labeled baseline. By running the same sensor data for known scenarios that were encountered through different versions of the perception technology, a comparison may be made. For instance, the perception data derived by each version of the perception technology during its simulated drive may be reviewed to determine how well the perception operation tracked and identified objects in the scenario.

In this regard, the flexibility of perception database 450 to identify perception data that indicates particular scenarios of interest may mitigate one of the shortcomings associated with human-labeling only certain limited subsets of sensor data. In particular, it allows for the limited amount of human-labeling that can be performed to be performed on sensor data that indicates targeted scenarios of interest.

A third task that may be enabled by the augmented perception data in perception database 450 involves building improved sensor datasets that may be used to more effectively train machine learning models that are utilized as part of an ego vehicle's perception technology. In some embodiments, the supplemental information in perception database 450 may allow for queries that identify a diverse subset of perception objects and events that ego vehicle 410 may encounter. The corresponding subset of sensor data that relates to these perception objects and events, which may be similarly diverse, is then designated for human labeling and thereafter used for model training. Accordingly, the resulting model may be more robust than previous models, which may have been trained using a relatively arbitrary sensor datasets that were not as diverse.

In other embodiments, the more detailed information in perception database 450 may enable queries that isolate perception data corresponding to specific perception scenarios for the purpose of developing scenario-type recognition models. For instance, it may be desired to develop a scenario-type recognition model to identify instances of a lead vehicle cut-in, as discussed above. Accordingly, perception database 450 may be queried for all frames of perception data that indicate a lead vehicle cut-in scenario, and the corresponding sensor data may be retrieved, as generally shown in the example of FIG. 6. This sensor data may thereafter be labeled and used to train the scenario recognition model, as an alternative to or in addition to using the labeled sensor data for evaluating perception performance, as shown in FIG. 6.

While the examples above discuss several tasks that are enabled by the augmented perception data that is stored in perception database 450, numerous other tasks and advantageous uses for the augmented perception data and perception database 450 and are also possible.

Further, the examples discussed herein have generally referred to a single augmentation of an ego vehicle's derived perception data with supplemental information, such as geometric and semantic tags, that are already known to be associated with useful perception events and scenarios. This arrangement may be preferable, as the sensor data only needs to be run through tagging engine 440 a single time. However, it is also contemplated that other useful scenarios and perception events may be identified that are not currently tagged within the perception data, but could be. Thus, it is also possible to add further supplemental information in the form of new tags to the augmented perception data that is stored in perception database 450. This may involve remote computing system 420, via tagging engine 440, reprocessing the sensor data, and possibly the perception data and/or augmented perception data, to generate the additional supplemental information. Remote computing system 420 may then further augment the perception data with the new tags.

Figure 7:
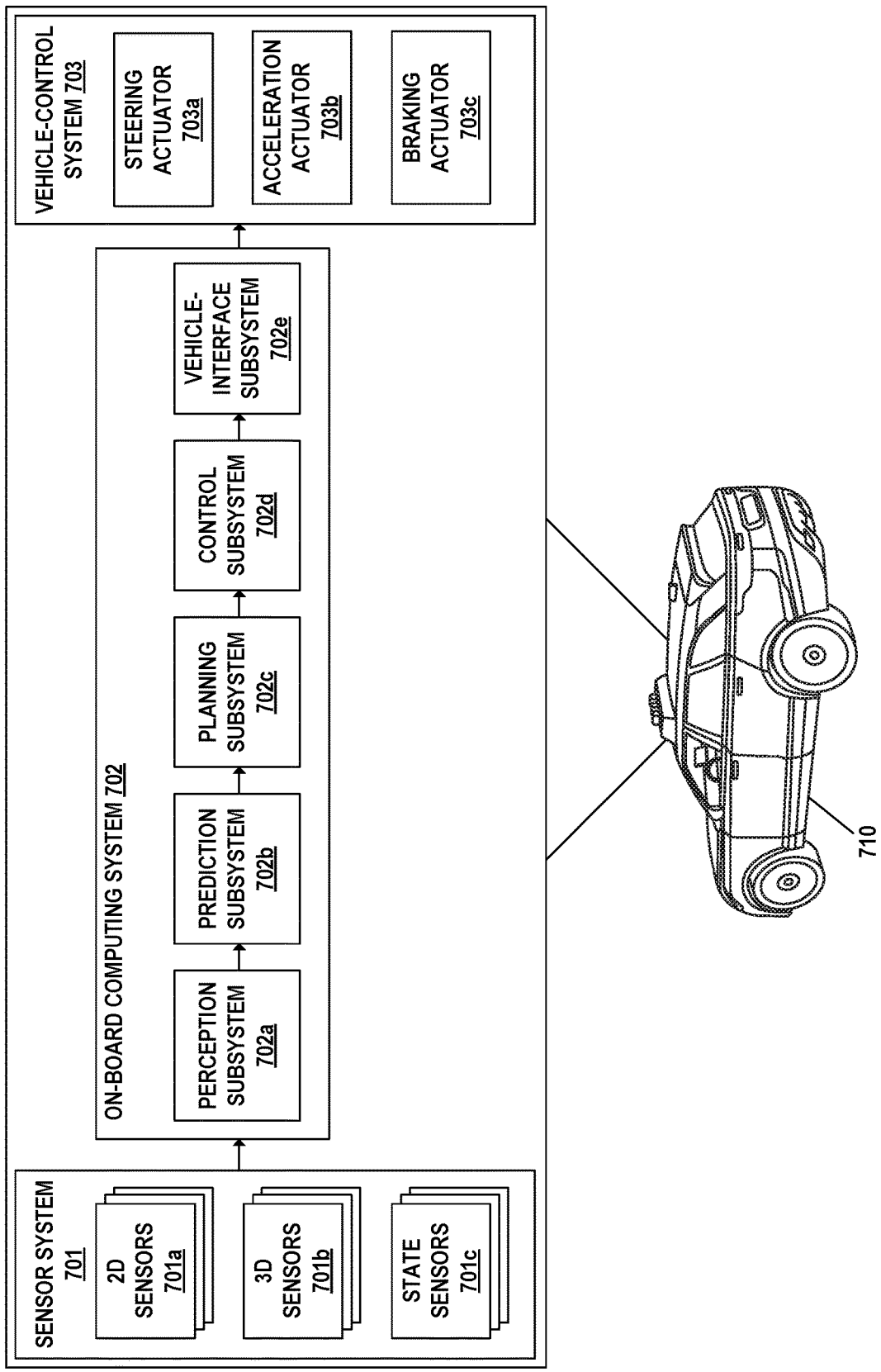
FIG. 7 is a simplified block diagram that illustrates example systems of an example vehicle equipped with autonomous technology.

Turning now to FIG. 7, a simplified block diagram is provided to illustrate certain systems that may be included in an example collection vehicle 710. As shown, at a high level, collection vehicle 710 may include at least (i) a sensor system 701 that is configured to capture sensor data that is representative of the real-world environment being perceived by the AV (i.e., the collection vehicle's "surrounding environment") and/or the collection vehicle's operation within that real-world environment, (ii) an on-board computing system 702 that is configured to perform functions related to autonomous operation of collection vehicle 710 (and perhaps other functions as well), and (iii) a vehicle-control system 703 that is configured to control the physical operation of collection vehicle 710, among other possibilities. Each of these AV systems may take various forms.

In general, sensor system 701 may comprise any of various different types of sensors, each of which is generally configured to detect one or more particular stimuli based on collection vehicle 710 operating in a real-world environment. The sensors then output sensor data that is indicative of one or more measured values of the one or more stimuli at one or more capture times (which may each comprise a single instant of time or a range of times).

For instance, as one possibility, sensor system 701 may include one or more two-dimensional (2D) sensors 701a that are each configured to capture 2D data that is representative of the collection vehicle's surrounding environment. Examples of 2D sensor(s) 701a may include a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 701a have an arrangement that is capable of capturing 2D sensor data representing a 360° view of the collection vehicle's surrounding environment, one example of which may take the form of an array of 6-7 cameras that each have a different capture angle. Other 2D sensor arrangements are also possible.

As another possibility, sensor system 701 may include one or more three-dimensional (3D) sensors 701b that are each configured to capture 3D data that is representative of the collection vehicle's surrounding environment. Examples of 3D sensor(s) 701b may include a LIDAR unit, a 3D RADAR unit, a 3D SONAR unit, a 3D ultrasound unit, and a camera array equipped for stereo vision, among other possibilities. Further, in an example implementation, 3D sensor(s) 701b may comprise an arrangement that is capable of capturing 3D sensor data representing a 360° view of the collection vehicle's surrounding environment, one example of which may take the form of a LIDAR unit that is configured to rotate 360° around its installation axis. Other 3D sensor arrangements are also possible.

As yet another possibility, sensor system 701 may include one or more state sensors 701c that are each configured to detect aspects of the collection vehicle's current state, such as the collection vehicle's current position, current orientation (e.g., heading/yaw, pitch, and/or roll), current velocity, and/or current acceleration of collection vehicle 710. Examples of state sensor(s) 701c may include an Inertial Measurement Unit (IMU) (which may be comprised of accelerometers, gyroscopes, and/or magnetometers), an Inertial Navigation System (INS), a Global Navigation Satellite System (GNSS) unit such as a Global Positioning System (GPS) unit, among other possibilities.

Sensor system 701 may include various other types of sensors as well.

In turn, on-board computing system 702 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 702 may take the form of any one or more interfaces that facilitate communication with other systems of collection vehicle 710 (e.g., sensor system 701, vehicle-control system 703, etc.) and/or remote computing systems (e.g., a transportation request management system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 702 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 702 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 702 such that on-board computing system 702 is configured to perform various functions related to the autonomous operation of collection vehicle 710 (among other possible functions), and (ii) data that may be obtained, derived, or otherwise stored by on-board computing system 702.

In one embodiment, on-board computing system 702 may also be functionally configured into a number of different subsystems that are each tasked with performing a specific subset of functions that facilitate the autonomous operation of collection vehicle 710, and these subsystems may be collectively referred to as the collection vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 702.

As shown in FIG. 7, in one embodiment, the functional subsystems of on-board computing system 702 may include (i) a perception subsystem 702a that generally functions to derive a representation of the surrounding environment being perceived by collection vehicle 710, (ii) a prediction subsystem 702b that generally functions to predict the future state of each object detected in the collection vehicle's surrounding environment, (iii) a planning subsystem 702c that generally functions to derive a behavior plan for collection vehicle 710, (iv) a control subsystem 702d that generally functions to transform the behavior plan for collection vehicle 710 into control signals for causing collection vehicle 710 to execute the behavior plan, and (v) a vehicle-interface subsystem 702e that generally functions to translate the control signals into a format that vehicle-control system 703 can interpret and execute. However, it should be understood that the functional subsystems of on-board computing system 702 may take various other forms as well. Each of these example subsystems will now be described in further detail below.

For instance, the subsystems of on-board computing system 702 may begin with perception subsystem 702a, which may be configured to fuse together various different types of "raw" data that relate to the collection vehicle's perception of its surrounding environment and thereby derive a representation of the surrounding environment being perceived by collection vehicle 710. In this respect, the "raw" data that is used by perception subsystem 702a to derive the representation of the collection vehicle's surrounding environment may take any of various forms.

For instance, at a minimum, the "raw" data that is used by perception subsystem 702a may include multiple different types of sensor data captured by sensor system 701, such as 2D sensor data (e.g., image data) that provides a 2D representation of the collection vehicle's surrounding environment, 3D sensor data (e.g., LIDAR data) that provides a 3D representation of the collection vehicle's surrounding environment, and/or state data for collection vehicle 710 that indicates the past and current position, orientation, velocity, and acceleration of collection vehicle 710. Additionally, the "raw" data that is used by perception subsystem 702a may include map data associated with the collection vehicle's location, such as high-definition geometric and/or semantic map data, which may be preloaded onto on-board computing system 702 and/or obtained from a remote computing system. Additionally yet, the "raw" data that is used by perception subsystem 702a may include navigation data for collection vehicle 710 that indicates a specified origin and/or specified destination for collection vehicle 710, which may be obtained from a remote computing system (e.g., a transportation request management system) and/or input by a human riding in collection vehicle 710 via a user-interface component that is communicatively coupled to on-board computing system 702. Additionally still, the "raw" data that is used by perception subsystem 702a may include other types of data that may provide context for the collection vehicle's perception of its surrounding environment, such as weather data and/or traffic data, which may be obtained from a remote computing system. The "raw" data that is used by perception subsystem 702a may include other types of data as well.

Advantageously, by fusing together multiple different types of raw data (e.g., both 2D sensor data and 3D sensor data), perception subsystem 702a is able to leverage the relative strengths of these different types of raw data in a way that may produce a more accurate and precise representation of the surrounding environment being perceived by collection vehicle 710.

Further, the function of deriving the representation of the surrounding environment perceived by collection vehicle 710 using the raw data may include various aspects. For instance, one aspect of deriving the representation of the surrounding environment perceived by collection vehicle 710 using the raw data may involve determining a current state of collection vehicle 710 itself, such as a current position, a current orientation, a current velocity, and/or a current acceleration, among other possibilities. In this respect, perception subsystem 702a may also employ a localization technique such as Simultaneous Localization and Mapping (SLAM) to assist in the determination of the collection vehicle's current position and/or orientation. (Alternatively, it is possible that on-board computing system 702 may run a separate localization service that determines position and/or orientation values for collection vehicle 710 based on raw data, in which case these position and/or orientation values may serve as another input to perception subsystem 702a).

Another aspect of deriving the representation of the surrounding environment perceived by collection vehicle 710 using the raw data may involve detecting objects within the collection vehicle's surrounding environment, which may result in the determination of class labels, bounding boxes, or the like for each detected object. In this respect, the particular classes of objects that are detected by perception subsystem 702a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 702a may be configured to detect objects within the collection vehicle's surrounding environment using any type of object detection model now known or later developed, including but not limited object detection models based on convolutional neural networks (CNN).

Yet another aspect of deriving the representation of the surrounding environment perceived by collection vehicle 710 using the raw data may involve determining a current state of each object detected in the collection vehicle's surrounding environment, such as a current position (which could be reflected in terms of coordinates and/or in terms of a distance and direction from collection vehicle 710), a current orientation, a current velocity, and/or a current acceleration of each detected object, among other possibilities. In this respect, the current state of each detected object may be determined either in terms of an absolute measurement system or in terms of a relative measurement system that is defined relative to a state of collection vehicle 710, among other possibilities.

The function of deriving the representation of the surrounding environment perceived by collection vehicle 710 using the raw data may include other aspects as well.

Further yet, the derived representation of the surrounding environment perceived by collection vehicle 710 may incorporate various different information about the surrounding environment perceived by collection vehicle 710, examples of which may include (i) a respective set of information for each object detected in the collection vehicle's surrounding, such as a class label, a bounding box, and/or state information for each detected object, (ii) a set of information for collection vehicle 710 itself, such as state information and/or navigation information (e.g., a specified destination), and/or (iii) other semantic information about the surrounding environment (e.g., time of day, weather conditions, traffic conditions, etc.). The derived representation of the surrounding environment perceived by collection vehicle 710 may incorporate other types of information about the surrounding environment perceived by collection vehicle 710 as well.

Still further, the derived representation of the surrounding environment perceived by collection vehicle 710 may be embodied in various forms. For instance, as one possibility, the derived representation of the surrounding environment perceived by collection vehicle 710 may be embodied in the form of a data structure that represents the surrounding environment perceived by collection vehicle 710, which may comprise respective data arrays (e.g., vectors) that contain information about the objects detected in the surrounding environment perceived by collection vehicle 710, a data array that contains information about collection vehicle 710, and/or one or more data arrays that contain other semantic information about the surrounding environment. Such a data structure may be referred to as a "parameter-based encoding."

As another possibility, the derived representation of the surrounding environment perceived by collection vehicle 710 may be embodied in the form of a rasterized image that represents the surrounding environment perceived by collection vehicle 710 in the form of colored pixels. In this respect, the rasterized image may represent the surrounding environment perceived by collection vehicle 710 from various different visual perspectives, examples of which may include a "top down" view and a "birds eye" view of the surrounding environment, among other possibilities. Further, in the rasterized image, the objects detected in the surrounding environment of collection vehicle 710 (and perhaps collection vehicle 710 itself) could be shown as color-coded bitmasks and/or bounding boxes, among other possibilities.

The derived representation of the surrounding environment perceived by collection vehicle 710 may be embodied in other forms as well.

As shown, perception subsystem 702a may pass its derived representation of the collection vehicle's surrounding environment to prediction subsystem 702b. In turn, prediction subsystem 702b may be configured to use the derived representation of the collection vehicle's surrounding environment (and perhaps other data) to predict a future state of each object detected in the collection vehicle's surrounding environment at one or more future times (e.g., at each second over the next 5 seconds)—which may enable collection vehicle 710 to anticipate how the real-world objects in its surrounding environment are likely to behave in the future and then plan its behavior in a way that accounts for this future behavior.

Prediction subsystem 702b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 702b is configured to predict this type of future state information for a detected object at multiple future times, such a time sequence of future states may collectively define a predicted future trajectory of the detected object. Further, in some embodiments, prediction subsystem 702b could be configured to predict multiple different possibilities of future states for a detected object (e.g., by predicting the 3 most-likely future trajectories of the detected object). Prediction subsystem 702b may be configured to predict other aspects of a detected object's future behavior as well.

In practice, prediction subsystem 702b may predict a future state of an object detected in the collection vehicle's surrounding environment in various manners, which may depend in part on the type of detected object. For instance, as one possibility, prediction subsystem 702b may predict the future state of a detected object using a data science model that is configured to (i) receive input data that includes one or more derived representations output by perception subsystem 702a at one or more perception times (e.g., the "current" perception time and perhaps also one or more prior perception times), (ii) based on an evaluation of the input data, which includes state information for the objects detected in the collection vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 702, although it is possible that a future-state model could be created by on-board computing system 702 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 702b could predict the future state of a detected object in other manners as well. For instance, for detected objects that have been classified by perception subsystem 702a as belonging to certain classes of static objects (e.g., roads, curbs, lane markings, etc.), which generally do not have the potential to move, prediction subsystem 702b may rely on this classification as a basis for predicting that the future state of the detected object will remain the same at each of the one or more future times (in which case the state-prediction model may not be used for such detected objects). However, it should be understood that detected objects may be classified by perception subsystem 702a as belonging to other classes of static objects that have the potential to change state despite not having the potential to move, in which case prediction subsystem 702b may still use a future-state model to predict the future state of such detected objects. One example of a static object class that falls within this category is a traffic light, which generally does not have the potential to move but may nevertheless have the potential to change states (e.g. between green, yellow, and red) while being perceived by collection vehicle 710.

After predicting the future state of each object detected in the surrounding environment perceived by collection vehicle 710 at one or more future times, prediction subsystem 702b may then either incorporate this predicted state information into the previously-derived representation of the collection vehicle's surrounding environment (e.g., by adding data arrays to the data structure that represents the surrounding environment) or derive a separate representation of the collection vehicle's surrounding environment that incorporates the predicted state information for the detected objects, among other possibilities.

As shown, prediction subsystem 702b may pass the one or more derived representations of the collection vehicle's surrounding environment to planning subsystem 702c. In turn, planning subsystem 702c may be configured to use the one or more derived representations of the collection vehicle's surrounding environment (and perhaps other data) to derive a behavior plan for collection vehicle 710, which defines the desired driving behavior of collection vehicle 710 for some future period of time (e.g., the next 5 seconds).

The behavior plan that is derived for collection vehicle 710 may take various forms. For instance, as one possibility, the derived behavior plan for collection vehicle 710 may comprise a planned trajectory for collection vehicle 710 that specifies a planned state of collection vehicle 710 at each of one or more future times (e.g., each second over the next 5 seconds), where the planned state for each future time may include a planned position of collection vehicle 710 at the future time, a planned orientation of collection vehicle 710 at the future time, a planned velocity of collection vehicle 710 at the future time, and/or a planned acceleration of collection vehicle 710 (whether positive or negative) at the future time, among other possible types of state information. As another possibility, the derived behavior plan for collection vehicle 710 may comprise one or more planned actions that are to be performed by collection vehicle 710 during the future window of time, where each planned action is defined in terms of the type of action to be performed by collection vehicle 710 and a time and/or location at which collection vehicle 710 is to perform the action, among other possibilities. The derived behavior plan for collection vehicle 710 may define other planned aspects of the collection vehicle's behavior as well.

Further, in practice, planning subsystem 702c may derive the behavior plan for collection vehicle 710 in various manners. For instance, as one possibility, planning subsystem 702c may be configured to derive the behavior plan for collection vehicle 710 by (i) deriving a plurality of different "candidate" behavior plans for collection vehicle 710 based on the one or more derived representations of the collection vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for collection vehicle 710. Planning subsystem 702c may derive the behavior plan for collection vehicle 710 in various other manners as well.

After deriving the behavior plan for collection vehicle 710, planning subsystem 702c may pass data indicating the derived behavior plan to control subsystem 702d. In turn, control subsystem 702d may be configured to transform the behavior plan for collection vehicle 710 into one or more control signals (e.g., a set of one or more command messages) for causing collection vehicle 710 to execute the behavior plan. For instance, based on the behavior plan for collection vehicle 710, control subsystem 702d may be configured to generate control signals for causing collection vehicle 710 to adjust its steering in a specified manner, accelerate in a specified manner, and/or brake in a specified manner, among other possibilities.

As shown, control subsystem 702d may then pass the one or more control signals for causing collection vehicle 710 to execute the behavior plan to vehicle-interface subsystem 702e. In turn, vehicle-interface subsystem 702e may be configured to translate the one or more control signals into a format that can be interpreted and executed by components of vehicle-control system 703. For example, vehicle-interface subsystem 702e may be configured to translate the one or more control signals into one or more control messages are defined according to a particular format or standard, such as a CAN bus standard and/or some other format or standard that is used by components of vehicle-control system 703.

In turn, vehicle-interface subsystem 702e may be configured to direct the one or more control signals to the appropriate control components of vehicle-control system 703. For instance, as shown, vehicle-control system 703 may include a plurality of actuators that are each configured to control a respective aspect of the collection vehicle's physical operation, such as a steering actuator 703a that is configured to control the vehicle components responsible for steering (not shown), an acceleration actuator 703b that is configured to control the vehicle components responsible for acceleration such as a throttle (not shown), and a braking actuator 703c that is configured to control the vehicle components responsible for braking (not shown), among other possibilities. In such an arrangement, vehicle-interface subsystem 702e of on-board computing system 702 may be configured to direct steering-related control signals to steering actuator 703a, acceleration-related control signals to acceleration actuator 703b, and braking-related control signals to braking actuator 703c. However, it should be understood that the control components of vehicle-control system 703 may take various other forms as well.

Notably, the subsystems of on-board computing system 702 may be configured to perform the above functions in a repeated manner, such as many times per second, which may enable collection vehicle 710 to continually update both its understanding of the surrounding environment and its planned behavior within that surrounding environment.

Although not specifically shown, it should be understood that collection vehicle 710 includes various other systems and components as well, including but not limited to a propulsion system that is responsible for creating the force that leads to the physical movement of collection vehicle 710.

Figure 8:
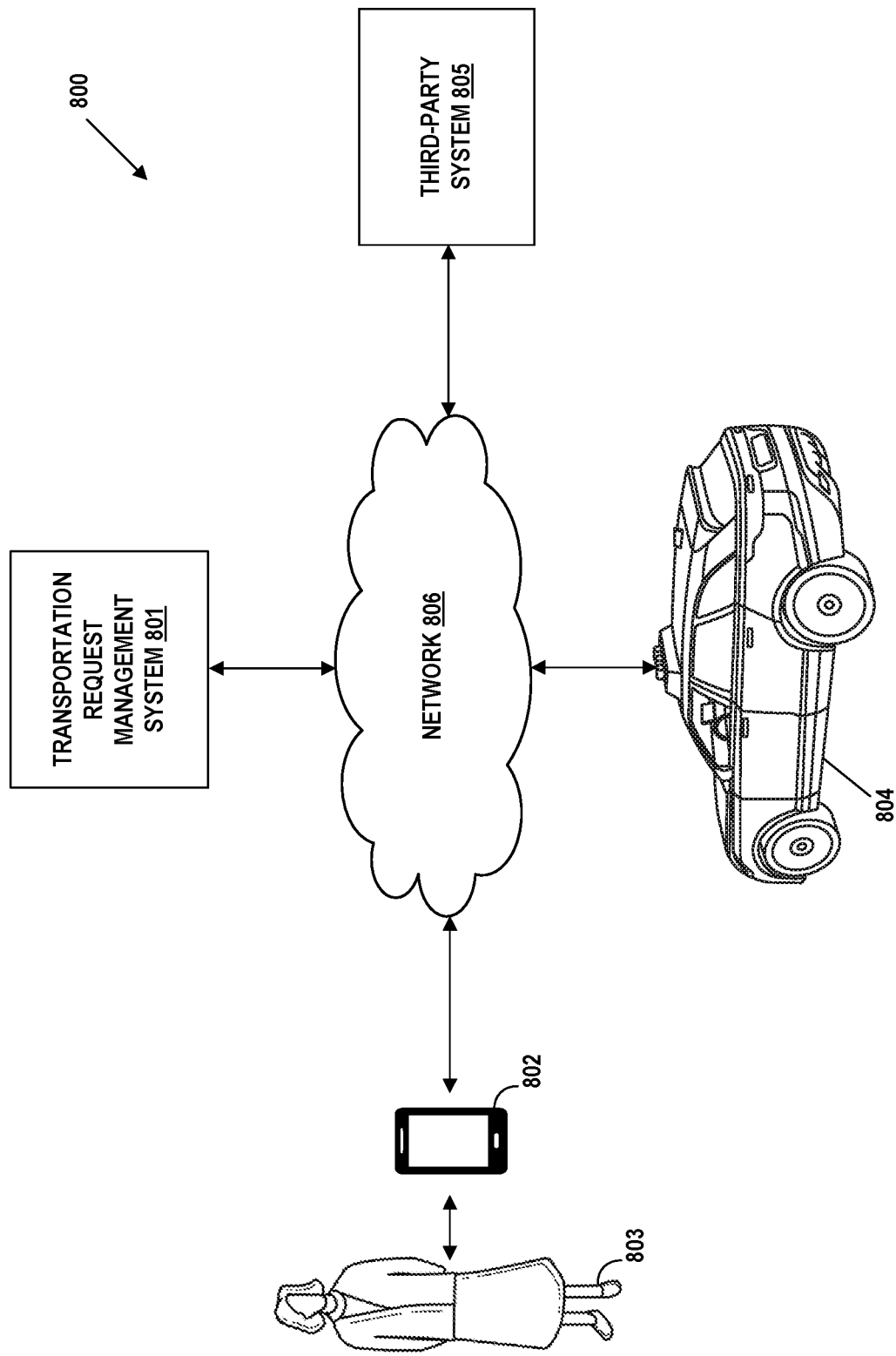
FIG. 8 is a simplified block diagram that illustrates one example of a transportation matching platform.

There are many use cases for the vehicles described herein, including but not limited to use cases for transportation of both human passengers and various types of goods. In this respect, one possible use case for the vehicles described herein involves a transportation matching platform in which individuals interested in taking a ride from one location to another are matched with vehicles (e.g., AVs) that can provide the requested ride. FIG. 8 is a simplified block diagram that illustrates one example of such a transportation matching platform 800. As shown, transportation matching platform 800 may include at its core a transportation request management system 801, which may be communicatively coupled via a communication network 806 to (i) a plurality of client stations of individuals interested in transportation (i.e., "transportation requestors"), of which client station 802 of transportation requestor 803 is shown as one representative example, (ii) a plurality of AVs that are capable of providing the requested rides, of which AV 804 is shown as one representative example, and (iii) a plurality of third-party systems that are capable of providing respective subservices that facilitate the platform's transportation matching, of which third-party system 805 is shown as one representative example.

Broadly speaking, transportation request management system 801 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation request management system 801 may comprise computing infrastructure of a public, private, and/or hybrid cloud (e.g., computing and/or storage clusters). In this respect, the entity that owns and operates transportation request management system 801 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation request management system 801 may comprise one or more dedicated servers. Other implementations of transportation request management system 801 are possible as well.

As noted, transportation request management system 801 may be configured to perform functions related to managing and facilitating transportation matching, which may take various forms. For instance, as one possibility, transportation request management system 801 may be configured to receive ride requests from client stations of ride requestors (e.g., client station 802 of ride requestor 803) and then fulfill such ride requests by dispatching suitable vehicles, which may include AVs such as AV 804. In this respect, a ride request from client station 802 of ride requestor 803 may include various types of information.

For example, a ride request from client station 802 of ride requestor 803 may include specified pick-up and drop-off locations for the ride. As another example, a ride request from client station 802 of ride requestor 803 may include an identifier that identifies ride requestor 803 in transportation request management system 801, which may be used by transportation request management system 801 to access information about ride requestor 803 (e.g., profile information) that is stored in one or more data stores of transportation request management system 801 (e.g., a relational database system), in accordance with the ride requestor's privacy settings. This ride requestor information may take various forms, examples of which include profile information about ride requestor 803. As yet another example, a ride request from client station 802 of ride requestor 803 may include preferences information for ride requestor 803, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation request management system 801 may be configured to access ride information related to a requested ride, examples of which may include information about locations related to the ride, traffic data, route options, optimal pick-up or drop-off locations for the ride, and/or any other suitable information associated with a ride. As an example and not by way of limitation, when transportation request management system 801 receives a request to ride from San Francisco International Airport (SFO) to Palo Alto, California, system 801 may access or generate any relevant ride information for this particular ride request, which may include preferred pick-up locations at SFO, alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of ride requestor, and/or any other suitable information associated with the ride.

In some embodiments, portions of the accessed ride information could also be based on historical data associated with historical rides facilitated by transportation request management system 801. For example, historical data may include aggregate information generated based on past ride information, which may include any ride information described herein and/or other data collected by sensors affixed to or otherwise located within vehicles (including sensors of other computing devices that are located in the vehicles such as client stations). Such historical data may be associated with a particular ride requestor (e.g., the particular ride requestor's preferences, common routes, etc.), a category/class of ride requestors (e.g., based on demographics), and/or all ride requestors of transportation request management system 801.

For example, historical data specific to a single ride requestor may include information about past rides that a particular ride requestor has taken, including the locations at which the ride requestor is picked up and dropped off, music the ride requestor likes to listen to, traffic information associated with the rides, time of day the ride requestor most often rides, and any other suitable information specific to the ride requestor. As another example, historical data associated with a category/class of ride requestors may include common or popular ride preferences of ride requestors in that category/class, such as teenagers preferring pop music, ride requestors who frequently commute to the financial district may prefer to listen to the news, etc. As yet another example, historical data associated with all ride requestors may include general usage trends, such as traffic and ride patterns.

Using such historical data, transportation request management system 801 could be configured to predict and provide ride suggestions in response to a ride request. For instance, transportation request management system 801 may be configured to apply one or more machine-learning techniques to such historical data in order to "train" a machine-learning model to predict ride suggestions for a ride request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation request management system 801 may only be capable of storing and later accessing historical data for a given ride requestor if the given ride requestor previously decided to "opt-in" to having such information stored. In this respect, transportation request management system 801 may maintain respective privacy settings for each ride requestor that uses transportation matching platform 800 and operate in accordance with these settings. For instance, if a given ride requestor did not opt-in to having his or her information stored, then transportation request management system 801 may forgo performing any of the above-mentioned functions based on historical data. Other possibilities also exist.

Transportation request management system 801 may be configured to perform various other functions related to managing and facilitating transportation matching as well.

Referring again to FIG. 8, client station 802 of ride requestor 803 may generally comprise any computing device that is configured to facilitate interaction between ride requestor 803 and transportation request management system 801. For instance, client station 802 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between ride requestor 803 and transportation request management system 801 (which may be embodied in the form of a software application, such as a mobile application, web application, or the like). In this respect, the interaction that may take place between ride requestor 803 and transportation request management system 801 may take various forms, representative examples of which may include requests by ride requestor 803 for new rides, confirmations by transportation request management system 801 that ride requestor 803 has been matched with an AV (e.g., AV 804), and updates by transportation request management system 801 regarding the progress of the ride, among other possibilities.

In turn, AV 804 may generally comprise any vehicle that is equipped with autonomous technology, and in one example, may take the form of collection vehicle 710 described above. Further, the functionality carried out by AV 804 as part of transportation matching platform 800 may take various forms, representative examples of which may include receiving a request from transportation request management system 801 to handle a new ride, autonomously driving to a specified pickup location for a ride, autonomously driving from a specified pickup location to a specified drop-off location for a ride, and providing updates regarding the progress of a ride to transportation request management system 801, among other possibilities.

Generally speaking, third-party system 805 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation request management system 801.

Moreover, third-party system 805 may be configured to perform functions related to various subservices. For instance, as one possibility, third-party system 805 may be configured to monitor traffic conditions and provide traffic data to transportation request management system 801 and/or AV 804, which may be used for a variety of purposes. For example, transportation request management system 801 may use such data to facilitate fulfilling ride requests in the first instance and/or updating the progress of initiated rides, and AV 804 may use such data to facilitate updating certain predictions regarding perceived agents and/or the collection vehicle's behavior plan, among other possibilities.

As another possibility, third-party system 805 may be configured to monitor weather conditions and provide weather data to transportation request management system 801 and/or AV 804, which may be used for a variety of purposes. For example, transportation request management system 801 may use such data to facilitate fulfilling ride requests in the first instance and/or updating the progress of initiated rides, and AV 804 may use such data to facilitate updating certain predictions regarding perceived agents and/or the collection vehicle's behavior plan, among other possibilities.

As yet another possibility, third-party system 805 may be configured to authorize and process electronic payments for ride requests. For example, after ride requestor 803 submits a request for a new ride via client station 802, third-party system 805 may be configured to confirm that an electronic payment method for ride requestor 803 is valid and authorized and then inform transportation request management system 801 of this confirmation, which may cause transportation request management system 801 to dispatch AV 804 to pick up ride requestor 803. After receiving a notification that the ride is complete, third-party system 805 may then charge the authorized electronic payment method for ride requestor 803 according to the fare for the ride. Other possibilities also exist.

Third-party system 805 may be configured to perform various other functions related to subservices that facilitate the platform's transportation matching as well. It should be understood that, although certain functions were discussed as being performed by third-party system 805, some or all of these functions may instead be performed by transportation request management system 801.

As discussed above, transportation request management system 801 may be communicatively coupled to client station 802, AV 804, and third-party system 805 via communication network 806, which may take various forms. For instance, at a high level, communication network 806 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 8 may take other forms as well, including the possibility that such communication paths include communication links and/or intermediate devices that are not shown.

In the foregoing arrangement, client station 802, AV 804, and/or third-party system 805 may also be capable of indirectly communicating with one another via transportation request management system 801. Additionally, although not shown, it is possible that client station 802, AV 804, and/or third-party system 805 may be configured to communicate directly with one another as well (e.g., via a short-range wireless communication path or the like). Further, AV 804 may also include a user-interface system that may facilitate direct interaction between ride requestor 803 and AV 804 once ride requestor 803 enters AV 804 and the ride begins.

It should be understood that transportation matching platform 800 may include various other entities and various other forms as well.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
maintaining a database of augmented perception data for scenes observed by one or more vehicles, wherein the augmented perception data comprises (a) object-level information for one or more objects detected within the scenes and (b) supplemental information for the scenes that is derived from, and adds to, the object-level information for the one or more objects;
executing a query of the database to identify an occurrence of a type of perception event within the scenes, wherein the query is based at least in part on the supplemental information included in the augmented perception data; and
based on the identified occurrence of the type of perception event, deriving a performance metric for an autonomy system that is indicative of perception performance for the autonomy system in scenes including the occurrence of the type of perception event.

2. The computer-implemented method of claim 1, wherein the type of perception event comprises one of (i) a detection of a phantom object, (ii) an object class label switch, or (iii) an object tracking discontinuity.

3. The computer-implemented method of claim 1, wherein the performance metric is for determining a capability of a specific version of the autonomy system to perform in one or more situations including the type of perception event.

4. The computer-implemented method of claim 1, wherein the type of perception event is an object class label switch, and wherein the query of the database to identify the occurrence of the type of perception event comprises a query to identify instances where an object had a class label switch from a first value to a second value and then back to the first value again within a given number of sequential frames.

5. The computer-implemented method of claim 1, wherein the query of the database to identify the occurrence of the type of perception event comprises a query of scenes observed by vehicles running a given version of a perception system.

6. The computer-implemented method of claim 1, wherein the supplemental information for the scenes comprises supplemental geometric information that indicates a spatial relationship between at least one object and one of the one or more vehicles, and wherein the query of the database is based at least in part on the supplemental geometric information.

7. The computer-implemented method of claim 1, wherein the augmented perception data in the database is derived by:
obtaining previously-derived perception data for the scenes observed by the one or more vehicles, wherein the previously-derived perception data comprises the object-level information for the one or more objects;
deriving the supplemental information for the scenes; and
augmenting the previously-derived perception data to include the supplemental information for the scenes.

8. The computer-implemented method of claim 1, wherein the augmented perception data comprises supplemental scene-level information for at least one scene observed by the one or more vehicles that includes one or both of spatial information or temporal information, and wherein the query is based at least in part on the supplemental scene-level information.

9. The computer-implemented method of claim 1, wherein the one or more objects were detected within respective sequences of frames observed by respective vehicles within the scenes, and wherein maintaining the database of augmented perception data comprises storing the augmented perception data in an arrangement that encodes a hierarchical relationship between the one or more objects, the respective sequences of frames, and the scenes.

10. A non-transitory computer-readable medium comprising program instructions stored thereon that are executable to cause a computing system to:
maintain a database of augmented perception data for scenes observed by one or more vehicles, wherein the augmented perception data comprises (a) object-level information for one or more objects detected within the scenes and (b) supplemental information for the scenes that is derived from, and adds to, the object-level information for the one or more objects;
execute a query of the database to identify an occurrence of a type of perception event within the scenes, wherein the query is based at least in part on the supplemental information included in the augmented perception data; and
based on the identified occurrence of the type of perception event, derive a performance metric for an autonomy system that is indicative of perception performance for the autonomy system in scenes including the occurrence of the type of perception event.

11. The computer-readable medium of claim 10, wherein the type of perception event comprises one of (i) a detection of a phantom object, (ii) an object class label switch, or (iii) an object tracking discontinuity.

12. The computer-readable medium of claim 10, wherein the performance metric is for determining a capability of a specific version of the autonomy system to perform in one or more situations including the type of perception event.

13. The computer-readable medium of claim 10, wherein the type of perception event is an object class label switch, and wherein the query of the database to identify the occurrence of the type of perception event comprises a query to identify instances where an object had a class label switch from a first value to a second value and then back to the first value again within a given number of sequential frames.

14. The computer-readable medium of claim 10, wherein the query of the database to identify the occurrence of the type of perception event comprises a query of scenes observed by vehicles running a given version of a perception system.

15. The computer-readable medium of claim 10, wherein the supplemental information for the scenes comprises supplemental geometric information that indicates a spatial relationship between at least one object and one of the one or more vehicles, and wherein the query of the database is based at least in part on the supplemental geometric information.

16. The computer-readable medium of claim 10, wherein the augmented perception data in the database is derived by:

obtaining previously-derived perception data for the scenes observed by the one or more vehicles, wherein the previously-derived perception data comprises the object-level information for the one or more objects;

deriving the supplemental information for the scenes; and augmenting the previously-derived perception data to include the supplemental information for the scenes.

17. The computer-readable medium of claim 10, wherein the augmented perception data comprises supplemental scene-level information for at least one scene observed by the one or more vehicles that includes one or both of spatial information or temporal information, and wherein the query is based at least in part on the supplemental scene-level information.

18. The computer-readable medium of claim 10, wherein the one or more objects were detected within respective sequences of frames observed by respective vehicles within the scenes, and wherein maintaining the database of augmented perception data comprises storing the augmented perception data in an arrangement that encodes a hierarchical relationship between the one or more objects, the respective sequences of frames, and the scenes.

19. A computing system comprising:
at least one processor;
a non-transitory computer-readable medium; and
program instructions stored on the non-transitory computer-readable medium that are executable by the at least one processor such that the computing system is capable of:

maintaining a database of augmented perception data for scenes observed by one or more vehicles, wherein the augmented perception data comprises (a) object-level information for one or more objects detected within the scenes and (b) supplemental information for the scenes that is derived from, and adds to, the object-level information for the one or more objects;

executing a query of the database to identify an occurrence of a type of perception event within the scenes, wherein the query is based at least in part on the supplemental information included in the augmented perception data; and based on the identified occurrence of the type of perception event, deriving a performance metric for an autonomy system that is indicative of perception performance for the autonomy system in scenes including the occurrence of the type of perception event.

20. The computing system of claim 19, wherein the type of perception event comprises one of (i) a detection of a phantom object, (ii) an object class label switch, or (iii) an object tracking discontinuity.

* * * * *